(12) United States Patent
Price et al.

(10) Patent No.: US 11,113,894 B1
(45) Date of Patent: Sep. 7, 2021

(54) SYSTEMS AND METHODS FOR GPS-BASED AND SENSOR-BASED RELOCALIZATION

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/018,753

(22) Filed: Sep. 11, 2020

(51) Int. Cl.
| | | |
|---|---|---|
| *G06T 19/00* | (2011.01) | |
| *G06F 3/01* | (2006.01) | |
| *G01S 19/35* | (2010.01) | |
| *G06K 9/62* | (2006.01) | |
| *G02B 27/01* | (2006.01) | |
| *G01C 5/06* | (2006.01) | |
| *G01S 19/47* | (2010.01) | |

(52) U.S. Cl.
CPC .......... *G06T 19/006* (2013.01); *G01C 5/06* (2013.01); *G01S 19/35* (2013.01); *G01S 19/47* (2013.01); *G02B 27/017* (2013.01); *G06F 3/012* (2013.01); *G06K 9/6215* (2013.01)

(58) Field of Classification Search
None
See application file for complete search history.

(56) References Cited

U.S. PATENT DOCUMENTS

| | | | |
|---|---|---|---|
| 7,720,572 B2* | 5/2010 | Ziegler | G16H 20/00 700/245 |
| 8,678,282 B1 | 3/2014 | Black et al. | |
| 9,600,067 B2 | 3/2017 | Kumar et al. | |
| 9,766,703 B2 | 9/2017 | Miller | |
| 9,898,866 B2* | 2/2018 | Fuchs | G02B 27/017 |
| 10,748,302 B1* | 8/2020 | Dine | G06T 19/00 |
| 2011/0102800 A1* | 5/2011 | Bita | G01N 33/18 356/450 |
| 2011/0206236 A1* | 8/2011 | Center, Jr. | G06T 7/579 382/103 |

(Continued)

OTHER PUBLICATIONS

Clocker, et al., "Real-Time RGB-D Camera Relocalization", In Proceedings of the International Symposium on Mixed and Augmented Reality, Oct. 1, 2013, 7 Pages.

(Continued)

*Primary Examiner* — Martin Mushambo
(74) *Attorney, Agent, or Firm* — Workman Nydegger

(57) ABSTRACT

Systems are configured for performing GPS-based and sensor-based relocalization. During the relocalization, the systems are configured to obtain radio-based positioning data indicating an estimated position of the system within a mapped environment. The systems are also configured to identify, based on the estimated position, a subset of keyframes of a map of the mapped environment, wherein the map of the mapped environment includes a plurality of keyframes captured from a plurality of locations within the mapped environment, and the plurality of keyframes are associated with anchor points identified within the mapped environment. The systems are further configured to perform relocalization within the mapped environment based on the subset of keyframes.

16 Claims, 11 Drawing Sheets

(56) References Cited

U.S. PATENT DOCUMENTS

| | | | |
|---|---|---|---|
| 2012/0147004 A1* | 6/2012 | Choi | G06T 13/40 345/420 |
| 2012/0306876 A1* | 12/2012 | Shotton | G06T 7/251 345/424 |
| 2013/0207966 A1* | 8/2013 | Chu | G06T 17/00 345/419 |
| 2014/0114564 A1* | 4/2014 | Callaghan | G01C 21/20 701/416 |
| 2014/0126769 A1* | 5/2014 | Reitmayr | G06T 7/73 382/103 |
| 2014/0354685 A1* | 12/2014 | Lazarow | G02B 27/0172 345/633 |
| 2014/0379256 A1* | 12/2014 | Stipes | G01C 21/32 701/501 |
| 2016/0147230 A1* | 5/2016 | Munich | G01C 21/206 701/28 |
| 2016/0179830 A1* | 6/2016 | Schmalstieg | G06F 16/9537 707/722 |
| 2016/0263477 A1* | 9/2016 | Ladd | A63F 13/212 |
| 2016/0317122 A1* | 11/2016 | dos Santos Mendonca | A61B 8/5269 |
| 2016/0350906 A1* | 12/2016 | Meier | G06T 17/10 |
| 2017/0336203 A1* | 11/2017 | Barnes | G01C 11/34 |
| 2018/0053056 A1* | 2/2018 | Rabinovich | G06N 3/0445 |
| 2018/0285052 A1* | 10/2018 | Eade | G03H 1/0005 |
| 2018/0299271 A1* | 10/2018 | Calloway | G01C 21/20 |
| 2018/0300897 A1* | 10/2018 | Woods | G06F 3/0484 |
| 2019/0155386 A1* | 5/2019 | Tadi | G06K 9/00536 |
| 2019/0362157 A1* | 11/2019 | Cambias | G06K 9/6256 |
| 2020/0158517 A1* | 5/2020 | Tadi | G01C 21/32 |

OTHER PUBLICATIONS

Kiss-Illés, et al., "GPS-SLAM: An Augmentation of the ORB-SLAM Algorithm", In Journal of Sensors, vol. 19, Issue 22, Nov. 15, 2019, 22 Pages.

Livingston, et al., "An Augmented Reality System for Military Operations in Urban Terrain", In Proceedings of the Interservice / Industry Training, Simulation & Education Conference, Dec. 2, 2002, 8 Pages.

South, Todd, "Soldiers, Marines Try Out New Device that Puts 'Mixed Reality,' Multiple Functions into Warfighter's Hands", Retrieved from: https://www.armytimes.com/news/your-army/2019/04/08/soldiers-marines-try-out-new-device-that-puts-mixed-reality-multiple-functions-into-warfighters-hands/, Apr. 8, 2019, 13 Pages.

* cited by examiner

SYSTEMS AND METHODS FOR GPS-BASED AND SENSOR-BASED RELOCALIZATION

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR experiences include virtual content (e.g., holograms) presented based on (1) the positioning of the user (and/or the MR system) relative to a physical environment and/or (2) the geometry of the physical environment. For example, some AR systems or pass-through VR systems may present virtual content relative real-world objects of an environment in which the user is positioned (or virtual representations thereof), such as a hologram of a figurine standing on a real-world table in the user's environment. An MR system may accurately present of such virtual content (e.g., in a manner that accommodates changes in user perspective) by maintaining a precise awareness of the position and orientation of the MR system (and/or the user) within a physical environment (e.g., with centimeter level accuracy).

To maintain such an awareness, many MR systems rely on simultaneous localization and mapping (SLAM) techniques. SLAM techniques often involve constructing and/or updating a map of a real-world environment while simultaneously tracking the location of an agent (e.g., an MR system) within the environment. In some instances, SLAM systems construct a map of a real-world environment from scratch, while in some instances, SLAM systems at least partially utilize a previously constructed map of a real-world environment.

A map of a real-world environment may include keyframes, which are generated based on captured image frames of the environment. A keyframe may include information about the position and orientation of an MR system that existed while the MR system captured the image frame for generating the keyframe. A keyframe may also be associated with various anchor points (e.g., features extracted from the image frame associated with the keyframe), and the MR system may utilize the anchor points as anchors for measuring pose changes of the MR system (e.g., frame-to-frame pose changes).

To initialize an MR experience using SLAM techniques, an MR system may facilitate user movement throughout a physical environment to allow the MR system to obtain a sufficient number of keyframes of the physical environment to construct a map of the physical environment. However, initial map construction is often time-consuming and significantly limits the versatility of MR systems for providing diverse MR experiences. For example, a user may be exposed to and gain a foreknowledge of a physical environment during the initial map construction process, which may limit the novelty of the MR experience for the user (e.g., the user will have already seen significant portions of the physical environment). For instance, gaming and/or training MR experiences may be limited in scope or effectiveness by requiring users to walk through the physical gaming or training space before the MR activity begins.

To avoid an initial map construction process, as noted above, an MR system may at least partially utilize a previously constructed map of a physical environment to initialize an MR experience. However, in order to use a previously constructed map of a physical environment to initialize an MR experience (e.g., to facilitate accurate hologram presentation), an MR system often must have an awareness of the location of the MR system relative to the physical environment. Stated differently, the MR system must localize itself within the physical environment (an MR system may also need to relocalize itself within the physical environment if tracking fails during the MR experience (e.g., where sensors of the MR system temporarily fail). As used herein, the terms "localize" and "relocalize" are sometimes interchangeably with regard to a MR system identifying its relative position within an environment.

Often, MR systems localize within a physical environment using keyframes of the previously constructed map of the environment, such as by determining feature correspondences to identify a keyframe associated with anchor points that correspond to current anchor points extracted from a current (or recent) image captured by the MR system. However, searching among the keyframes of a map may be computationally intensive and time-consuming, especially for maps of large real-world spaces that include numerous keyframes.

To avoid the time delay associated with localization by determining feature correspondences, described above, some MR experiences prescribe well-defined entrance points within the real-world environment, which indicate where the user should position themselves before initiating the MR experience in order to provide the MR system with an awareness of its location relative to the real-world environment. However, relying on well-defined entrance points also limits the versatility of MR experiences (e.g., removing the possibility of users to seamlessly enter an MR experience from different entrance points that are not predefined by the system).

Accordingly, conventional localization and/or relocalization techniques employed by MR systems may limit the types of experiences that MR system may provide. For example, where a large gaming or training arena is associated with a previously constructed dense map (containing numerous keyframes) for facilitating MR experiences within the arena, conventional MR systems may fail to allow users to seamlessly enter an MR experience in the arena from diverse entrance points that are not predefined by the MR system. Furthermore, conventional MR systems may fail to quickly relocalize if tracking is lost during the MR experience.

For at least the foregoing reasons, there is an ongoing need and desire for improved techniques and systems that may facilitate rapid system localization within an environment, particularly for use in MR experiences associated with maps of real-world environments that include numerous keyframes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for using global positioning to accelerate Simultenaous Localization and Mapping (SLAM)-based relocation, including systems and methods for GPS-based and sensor-based relocalization.

Some embodiments include computer-executable instructions that are executable by a system, such as a head-mounted display (HMD), to configure the system to perform methods associated with various acts, including an act of obtaining radio-based positioning data indicating an estimated position of the system within a mapped environment. Some of the disclosed methods also include identifying, based on the estimated position, a subset of keyframes of a map of the mapped environment, wherein the map of the mapped environment includes a plurality of keyframes captured from a plurality of locations within the mapped environment, and the plurality of keyframes are associated with anchor points identified within the mapped environment. Then, the system performs relocalization within the mapped environment based on the subset of keyframes.

Some embodiments include computer-executable instructions that are executable by a system, such as a head-mounted display (HMD), to configure the system to perform methods associated with various acts, including an act of tracking an estimated position of the system within the environment using a first tracking mode of the system. The disclosed methods also include detecting a presence of a triggering condition for selectively switching from the first tracking mode to a second tracking mode of the system, wherein the triggering condition is at least partially based on first tracking obtained according to the first tracking mode and wherein the second tracking mode comprises a high-fidelity tracking mode relative to the first tracking mode. Then, in response to detecting the presence of the triggering condition, the system selectively activates the second tracking mode of the system and tracking a position of the system within the environment using the second tracking mode.

Some embodiments include computer-executable instructions that are executable by a system, such as a head-mounted display (HMD), to configure the system to perform methods associated with various acts, including an act of generating head tracking data associated with the system, wherein the head tracking data is generated based on at least (1) visual tracking images obtained using one or more cameras associated with the system and (2) inertial tracking data obtained using one or more inertial tracking components associated with the system. Some of the disclosed methods also include obtaining radio-based positioning data generated using one or more radio-based positioning components associated with the system while limiting a search space within a map of the mapped environment based on the radio-based positioning data. Then, a pose of the system is determined within the search space using at least a portion of the head tracking data as input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
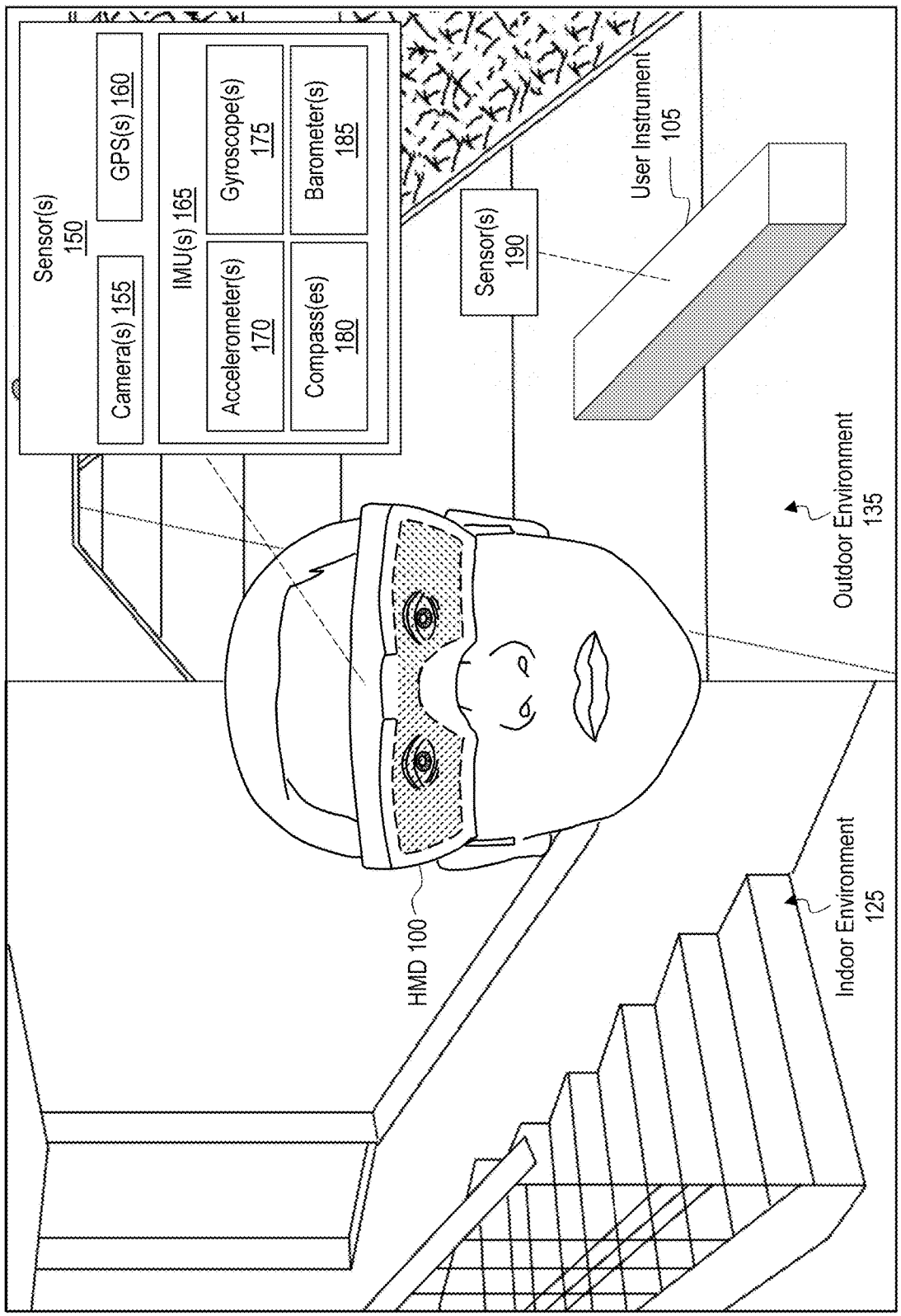
FIG. 1 illustrates an example mixed-reality system that may include or be used to implement disclosed embodiments.

Disclosed embodiments are generally directed to systems and methods for performing GPS-based and sensor-based relocalization.

Examples of Technical Benefits, Improvements, and Practical Applications

Those skilled in the art will recognize, in view of the present disclosure, that at least some of the disclosed embodiments may be implemented to address various shortcomings associated with conventional approaches for facilitating system localization/relocalization within a corresponding environment. The following section outlines some example improvements and/or practical applications provided by the disclosed embodiments. It will be appreciated, however, that the following are examples only and that the embodiments described herein are in no way limited to the example improvements discussed herein.

In some implementations, localizing a system within an environment based on a subset of keyframes of a map of an environment, rather than all keyframes of a map, allows the system to localize within the environment with reduced compute time and/or improved accuracy (as compared with conventional localization techniques). For example, a system may refrain from considering keyframes of the map that are not within the identified subset of keyframes as candidates for localization and may therefore refrain from analyzing anchor points of a potentially significant number of keyframes. By way of illustrative, non-limiting example, a system may reduce compute time for localization by reducing the candidate keyframes from about 1,000 keyframes to about 10 keyframes. Furthermore, because the subset of keyframes may be identified based on an estimated position of the system, the chances for false localization results may be reduced according to the presently disclosed embodiments.

Furthermore, by reducing the latency associated with localizing a system within an environment, at least some implementations of the present disclosure may provide versatile systems that may provide diverse MR experiences. For example, a system of the present disclosure may, in some instances, facilitate rapid and/or seamless localization of users entering a physical environment mapped for an MR experience from unmapped locations surrounding the physical environment, even where such entrance points are not predefined for the system. A rapid and/or seamless transition into an MR experience may enable users to rapidly begin engaging with accurately displayed virtual content, rather than waiting for the system to localize to facilitate entry into the MR experience.

Although the present disclosure focuses, in some respects, on facilitating rapid system localization within an MR context, it will be appreciated, in view of the present disclosure, that at least some of the principles disclosed herein are applicable to other tracking implementations, such as, for instance, drone navigation (or other autonomous navigation). For example, at least some embodiments disclosed enable tracking of a system under different tracking modes. A first tracking mode may provide an estimated position with less precision and/or fidelity than a second tracking mode. For instance, a first tracking mode may comprise a GPS tracking mode, and a second tracking mode may comprise SLAM. A system may track its GPS position according to the first tracking mode and intelligently determine whether to activate SLAM based on GPS data. For example, while traveling over regions of an environment that are not of interest or regions where SLAM would be impractical and/or unnecessary (e.g., airspace between a drone departure point and a drone landing point), a system may utilize GPS tracking, thereby avoiding expenditure of computational resources and battery power associated with SLAM. Upon determining that GPS position indicates that the system is within proximity to a target region, region of interest, or other portion of the environment where precise tracking is needed or desired (e.g., a drone landing point), the system may selectively activate SLAM (and may optionally localize the system, such as where the region of interest is a mapped region of a map of the environment for facilitating an MR environment).

Having just described some of the various high-level features and benefits of the disclosed embodiments, attention will now be directed to FIGS. 1 through 10. These Figures illustrate various conceptual representations, architectures, methods, and supporting illustrations related to the disclosed embodiments. The disclosure will then turn to FIG. 11, which presents an example computer system that may include and/or be used to facilitate the disclosed principles.

Example Mixed-Reality Systems and HMDs

Attention will now be directed to FIG. 1, which illustrates an example of a head-mounted device (HMD) 100 that includes sensor(s) 150 for use within various operational environments (e.g., indoor environment 125, outdoor environment 135). HMD 100 can comprise or implement any type of MR system, including a VR system or an AR system. It should be noted that while a substantial portion of this disclosure is focused, in some respects, on the use of an HMD, the embodiments are not limited to being practiced using only an HMD. That is, any type of system can be used, even systems entirely removed or separate from an HMD. As such, the disclosed principles should be interpreted broadly to encompass any type of tracking scenario or device. Some embodiments may even refrain from actively using sensor(s) 150 themselves and may simply use the data generated by another sensor device. For instance, some embodiments may at least be partially practiced in a cloud computing environment.

FIG. 1 illustrates HMD 100 as including sensor(s) 150, including camera(s) 155, GPS(s) 160, and inertial measurement unit(s) (IMU(s)) 165. IMU(s) 165 may comprise various inertial tracking components, such as accelerometer(s) 170, gyroscope(s) 175, compass(es) 180 (e.g., one or more magnetometers), and/or barometer(s) 185. Those skilled in the art will recognize, in view of the present disclosure, that the sensor(s) 150 illustrated in FIG. 1 in association with HMD 100 are not necessarily exhaustive, and that an HMD 100 may comprise any number of additional or alternative sensor(s) 150 in accordance with the present disclosure (e.g., eye tracking systems, microphones, and/or other sensing apparatuses). In some implementations, an HMD 100 includes fewer sensors than those depicted in FIG. 1.

The accelerometer(s) 170, gyroscope(s) 175, and compass(es) 180 are configured to measure inertial tracking data. Specifically, the accelerometer(s) 170 is/are configured to measure acceleration, the gyroscope(s) 175 is/are configured to measure angular velocity data, and the compass(es) 180 is/are configured to measure heading data. In some instances, an HMD 100 utilizes the inertial tracking components thereof (e.g., the components of IMU(s) 165)) to obtain three degree of freedom (3DOF) pose data associated with the HMD 100 (e.g., where visual tracking data, described below, is unavailable, unreliable, and/or undesired). As used herein, 3DOF refers to position (e.g., rotation) information associated with rotational axes about three perpendicular directional axes (e.g., pitch, yaw, and roll). For example, the 3DOF pose data associated with the HMD 100 may comprise an estimated orientation of the HMD 100 based on a gravity vector determined from acceleration data, a north orientation from compass data, and rotation derived from gyroscope data.

The inertial tracking components/system of the HMD 100 (i.e., the accelerometer(s) 170, gyroscope(s) 175, and compass(es) 180, which may be part of IMU(s) 165) may operate in concert with a visual tracking system to form a head tracking system that generates pose data for the HMD 100.

In some instances, a visual tracking system includes one or more cameras (e.g., one or more of camera(s) 155) that capture image data of an environment. In some instances, the HMD 100 obtains visual tracking data based on the images captured by the visual tracking system, such as objects within the environment that may provide an anchor for determining movement of the HMD 100 relative to the environment.

For example, visual-inertial Simultaneous Localization and Mapping (SLAM) techniques may comprise fusing (e.g., with a pose filter) visual tracking data obtained by one or more cameras (e.g., camera(s) 155) with inertial tracking data obtained by the accelerometer(s) 170, gyroscope(s) 175, and/or compass(es) 180 to estimate six degree of freedom (6DOF) positioning (i.e., pose) of the HMD 100 in relative to an environment and in real time (or near real time). 6DOF refers to positioning/velocity information associated with three perpendicular directional axes and the three rotational axes (often referred to as pitch, yaw, and roll) about each of the three perpendicular directional axes (often referred to as x, y, and z).

Unless otherwise specified, any reference herein to a "pose" or a related term describing positioning and/or orientation may refer to 3DOF or 6DOF pose.

The visual tracking system of an HMD 100, in some instances, includes a stereo pair of head tracking images (e.g., camera(s) 155) that is configured to obtain depth maps of the user's environment to provide visual mapping of the user's environment. The HMD 100 may utilize the visual mapping data of the environment to accurately display virtual content with respect to the user's environment, as well as to facilitate frame-to-frame pose tracking of the HMD 100 within the environment. Visual mapping data may also enable location sharing between users in a shared mixed-reality environment.

In some instances, the visual tracking system(s) of an HMD 100 (e.g., camera(s) 155) is/are implemented as one or more dedicated cameras. In other instances, the visual tracking system(s) is/are implemented as part of a camera system that performs other functions. Accordingly, an HMD 100 may utilize camera(s) 155 to scan environments, map environments, capture environmental data, and/or generate any kind of images of the environment. For example, in some instances, the HMD 100 is configured to generate a 3D representation of the real-world environment or generate a "pass-through" visualization. Furthermore, the camera(s) 155 of an HMD 100 may comprise any type of camera(s), such as, by way of non-limiting example, visible light cameras, low light cameras, thermal imaging cameras, ultraviolet cameras, near-infrared cameras, and/or others.

FIG. 1 also illustrates that HMD 100 may comprise GPS(s) 160 that obtains GPS data to track a global position of the HMD 100. Although FIG. 1 depicts GPS(s) 160 as a component of HMD 100, those skilled in the art will recognize, in view of the present disclosure, that other forms/types of radio-based positioning systems are within the scope of this disclosure. By way of non-limiting example, an HMD 100 can include any form/combination of bearing measurement systems, beam systems, transponder systems, hyperbolic systems, and/or other global navigation satellite systems (e.g., Galileo, QZSS, Beidou, etc.).

FIG. 1 also illustrates that, in some instances, an HMD 100 is associated with a user instrument 105. The user instrument 105 may comprise any type of handheld and/or wearable device that is usable in conjunction with the HMD 100 (or another system). For example, in some instances, a user instrument 105 is a controller, a medical/dental instrument, a first responder tool, etc. In some implementations, the user instrument 105 comprises sensor(s) 190, which may correspond in at least some respects to sensor(s) 150 of the HMD 100. For example, in some instances, sensor(s) 190 of a user instrument 105 comprise inertial tracking components, (e.g., similar to IMU(s) 165 and/or components thereof), and/or cameras (e.g., similar to camera(s) 155) to facilitate pose tracking of the user instrument 105 within an environment (e.g., via SLAM).

In some implementations, the HMD 100 and the user instrument 105 are configured to share data through a wired or wireless link (e.g., ultra-wideband, WLAN, infrared communication, Bluetooth, and/or others). In this regard, in some instances, sensor obtained by the sensor(s) 150 of the HMD 100 may be shared and/or associated with the user instrument 105, and/or vice versa. In some instances, at least some sensor devices mounted on or associated with the HMD 100 may be leveraged for the user instrument 105 as well. In one example, the HMD 100 may comprise GPS(s) 160, while the user instrument 105 omits a GPS. Notwithstanding, the GPS data obtained by the GPS(s) 160 of the HMD 100 may be associated with the user instrument 105, such that the GPS(s) 160 of the HMD 100 is operable to provide GPS tracking of both the HMD 100 and the user instrument 105 (e.g., operating on the assumption that the user instrument 105 stays within relatively close proximity to the HMD 100, such as within a range of about one meter).

GPS-Based and Sensor-Based Relocalization

Figure 2:
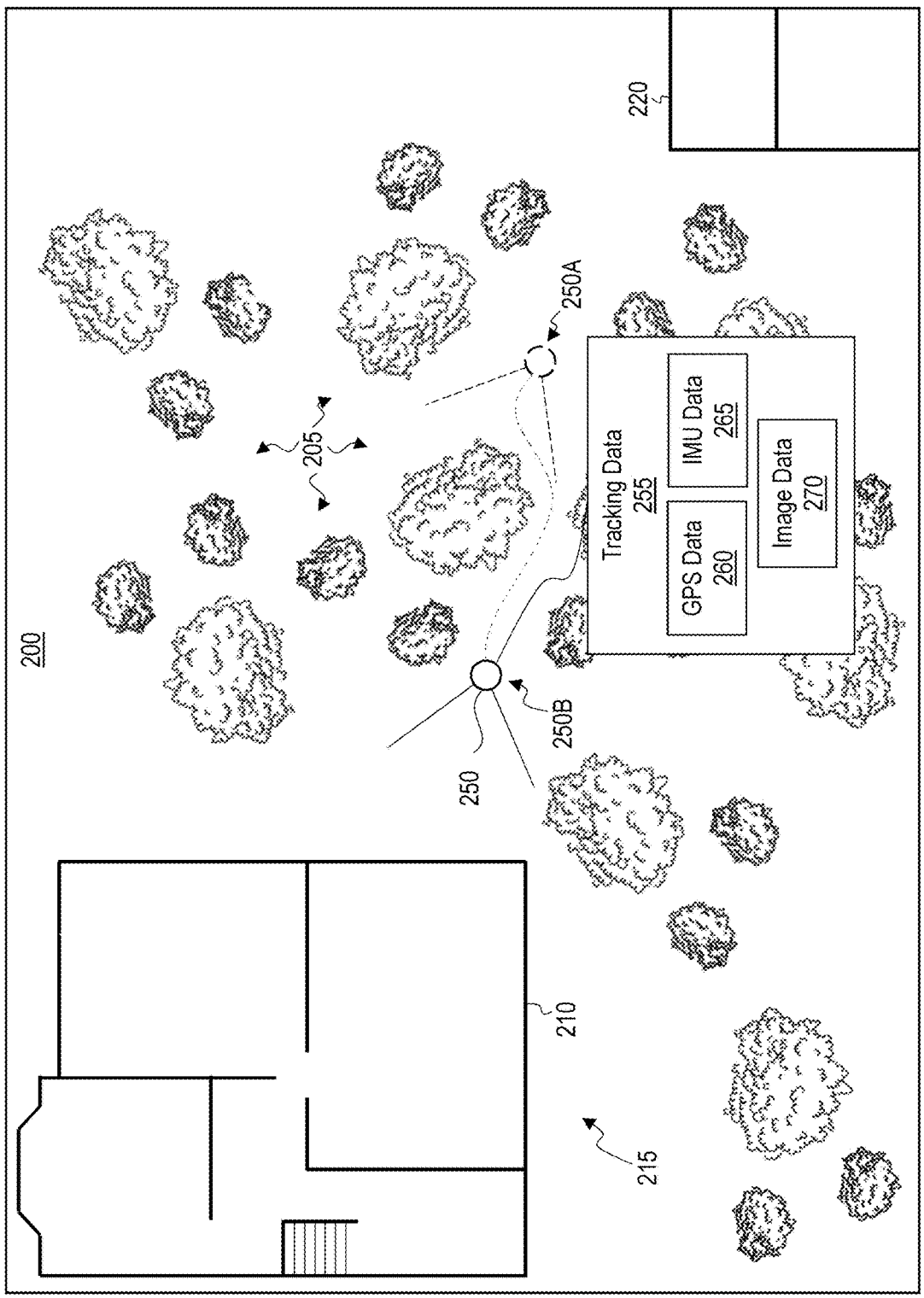
FIG. 2 illustrates an example environment in which a position of a mixed-reality system may be tracked.

Attention is now directed to FIG. 2, which illustrates an example environment 200 in which a position of an MR system may be tracked. The environment 200 includes various regions, such as a wooded area 205, building 210, building 220, and region 215 (which includes building 210 and portions of the environment 200 surrounding the building 210). As will be described in more detail hereinafter, the environment 200 is associated with a map of the environment (e.g., map 300, see FIGS. 3-5) that includes visual mapping data configured to facilitate MR experiences within at least some portions of the environment 200. For instance, a map of the environment may comprise visual mapping data associated with region 215 for facilitating SLAM within region 215 of the environment 200 (e.g., to facilitate accurate hologram presentation within region 215), whereas the map of the environment 200 may at least partially omit visual mapping data associated with the wooded area 205 such that the map is not configured to facilitate SLAM within the wooded area 205. In this regard, by way of example, the region 215 may be distinguished from the wooded area 205 as a target region or region of interest within the environment 200.

FIG. 2 illustrates a user 250 within the environment. Although not explicitly illustrated in FIG. 2, the user 250 is equipped with an HMD 100 and a user instrument 105 (or another system) as described hereinabove with reference to FIG. 1. Accordingly, in some instances, the HMD 100 and/or the user instrument 105 are configured to obtain tracking data 255 (e.g., via sensor(s) 150 and/or 190) to facilitate tracking of the HMD 100 and/or the user instrument 105 within at least some portions of the environment 200. For example, the HMD 100 and/or the user instrument 105 associated with the user 250 may obtain GPS data 260 (e.g., via GPS(s) 160), IMU data 265 (e.g., via accelerometer(s) 170, gyroscope(s) 175, compass(es) 180), and/or barometer(s) 185), and/or image data 270 (e.g., via camera(s) 155) within the environment 200. In some instances (e.g., where the user approaches or is within region 215), a portion of the tracking data 255 may form SLAM data or head tracking data (e.g., based on image data 270 of visual tracking images and inertial tracking data, such as IMU data 265).

FIG. 2 illustrates the user 250 traveling between position 250A within the wooded area 205 of the environment 200 toward position 250B within the region 215 (near building 210) of the environment 200. As noted above, a map of the environment may omit map data associated with the wooded area 205 of the environment (see FIGS. 3-5), which may prevent the system associated with the user 250 (e.g., HMD 100 and/or user instrument 105) from becoming aware of the user's location within the wooded area 205 of the environment 200 via SLAM.

Accordingly, in some examples, as the user 250 approaches the region 215 from the wooded area 205 (or from another area for which a map of the environment 200 omits visual mapping data, or for which visual mapping data is not intended for use), the system associated with the user 250 may need to establish its position relative to the region 215 (i.e., the system may need localize or relocalize) in order to facilitate SLAM to provide an accurate MR experience for the user 250 within region 215. However, a map of the environment 200 may comprise a large amount of visual mapping data for region 215 (and/or other portions of the environment 200, such as for building 220), which may cause latency and/or false localization in conventional systems.

Furthermore, at least some systems disclosed herein are configured to use tracking data (e.g., GPS data 260 and/or IMU data 265) to intelligently/selectably identify and select a subset of visual mapping data (e.g., a subset of keyframes) to use for localizing or relocalizing within an environment 200 (e.g., to facilitate MR experiences therein).

Figure 3:
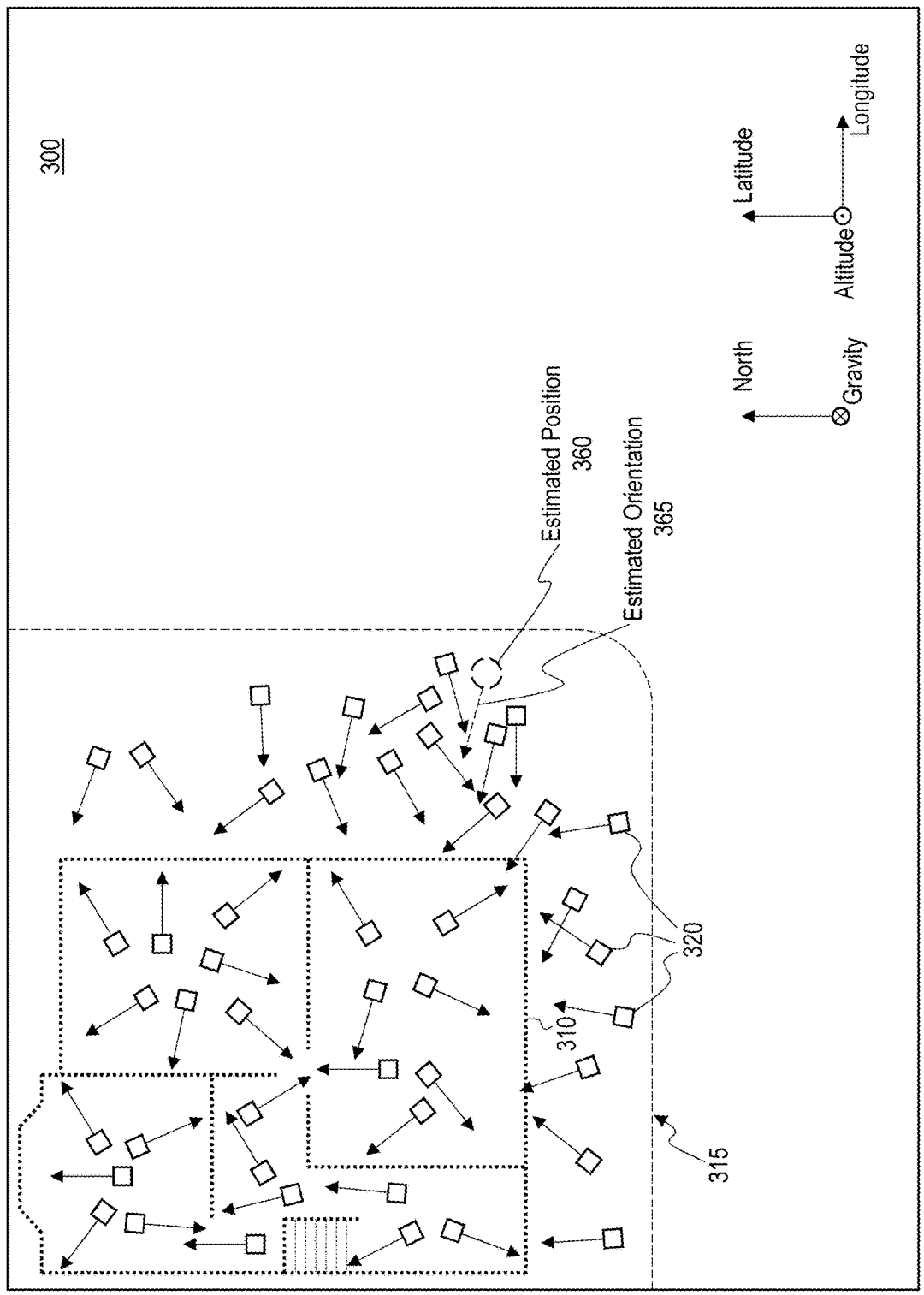
FIG. 3 illustrates an example map associated with the environment of FIG. 2.

FIG. 3 illustrates an example map 300 associated with the environment 200. As indicated above, the map 300 includes visual mapping data within a region 315 of the map 300, which corresponds to region 215 of the environment 200. For example, the map 300 includes visual mapping data in the form of a plurality of keyframes 320 and a plurality of anchor points 310 within region 315. In some instances, the visual mapping data within the region 315 of the map 300 are obtained prior to the entry of the user 250 to the region 215 of the environment 200 as illustrated in FIG. 2 (e.g., the visual mapping data may be obtained at a prior time by the system associated with the user 250 and/or by another system). Stated differently, at least region 315 of the map 300 may be considered to represent a pre-mapping of region 215 of the environment 200 that is configured to facilitate an MR experience within the region 215 upon localization within the region 215 (e.g., without first requiring users to capture or obtain new visual mapping data for region 215).

In some implementations, the keyframes 320 of the map 300 are obtained based on images captured using one or more cameras (e.g., cameras of HMD 100, user instrument 105, and/or another system). For example, in one implementation, a keyframe 320 may be obtained based on a stereo pair of images of a captured portion of the environment 200 within region 215 (e.g., captured by a stereo camera pair). A system may extract features from the stereo pair of images to identify anchor points 310 within the captured portion of the environment 200 within region 215. In some instances, a feature (sometimes referred to as "keypoints," "points of interest," or "features points") refers to a pixel within an image that comprises rich texture information, such as edges, corners, and/or other readily identifiable structures.

The anchor points 310 may provide reference points for tracking pose changes of agents relative to the captured portion of the environment within region 215 (e.g., during MR experiences). Furthermore, a system may perform depth calculations on the stereo pair of images to obtain depth data identifying the distances between the various anchor points 310 and the stereo camera pair during image capture. From the depth data, a position and orientation of the stereo camera pair relative to the anchor points 310 during image capture may be obtained or established. The positioning and orientation of the stereo camera pair relative to the anchor points 310 while capturing a stereo pair of images may become stored within the map 300 in association with anchor points 310 extracted from the captured stereo pair of images. In FIG. 3, each keyframe 320 is represented as a square located at the position from which the keyframe was captured, and the arrow extending from the square indicates the orientation from which the keyframe was captured. The anchor points 310 are represented in FIG. 3 as points.

Numerous keyframes 320 captured from a plurality of locations within the region 215, as well as numerous anchor points 310, may be obtained and stored as part of a map 300 of an environment 200, as illustrated in FIG. 3 for region 315 of the map 300, which is representative of region 215 of the environment 200. A system associated with the user 250 may utilize keyframes 320 and anchor points 310 to track its pose relative to the mapped portion of the map 300 of the environment 200. For example, when an initial position and orientation of the system are not known with confidence (e.g., when the system newly enters the region 315, as indicated in FIG. 2, or when the system has lost tracking during an MR experience within the region 315), the system may capture one or more current images of the region 315 at a current timepoint (e.g., image data 270 from FIG. 2).

The system may extract features from the current image(s) and compare those features with the anchor point 310 associated with the various keyframes 320 of the map 300. The system may identify a particular keyframe 320 that is associated with anchor points 310 that have a highest correspondence with the features extracted from the current image(s). The system may then estimate its position and orientation within the map 300 (i.e., the system may localize or relocalize) based on the position and orientation of the particular keyframe 320 associated with the anchor points 310 that have the highest correspondence with the features extracted from the current image(s) (see also FIGS. 6 and 7 and attendant description).

Subsequently, the system may track frame-to-frame pose changes of the system relative to the anchor points 310 (e.g., based on updated image data 270 and/or IMU data 265), and the system may use anchor points 310 associated with other keyframes 320 (e.g., other pre-mapped keyframes 320 or new keyframes captured by the system) to maintain accurate tracking as the user 250 moves throughout the region 215.

As indicated hereinabove, localizing a system relative to region 315 by identifying a particular pre-mapped keyframe 320 that is associated with anchor points 310 that have the highest correspondence to features extracted from one or more current image(s) (e.g., image data 270) may be computationally expensive and/or time-consuming, particularly for conventional systems that search through all pre-mapped keyframes 320 as candidates for localization (and especially where a map 300 includes numerous pre-mapped keyframes 320, as expressed in FIG. 3). Thus, at least some systems disclosed herein are configured to use tracking data (e.g., GPS data 260 and/or IMU data 265) to intelligently select a subset of keyframes 320 to use as candidates for localizing or relocalizing.

FIG. 3 illustrates an estimated position 360 of the user 250 and an estimated orientation 365 of the user 250 (or the system associated with the user) relative to the map 300 of the environment 200 in which the user 250 is positioned. The estimated position 360 and estimated orientation 365 of the user 250 at least partially correspond to the position 250B of the user 250 within the environment 200. For example, while the user 250 is positioned at position 250B within the environment, a system associated with the user 250 (e.g., HMD 100 and/or user instrument 105) may obtain GPS data 260 and/or IMU data 265.

In some implementations, the GPS data 260 (and, in some instances, IMU data 265 such as barometer data) indicates the estimated position 360 of the user 250 relative to the map 300. For instance, the GPS data 260 may indicate an estimated longitude (or "x" or "east" position) and latitude (or "y" or "north" position) (and, in at least some instances, an estimated altitude, or "z" or "up" position) of the GPS(s) 160 associated with the user 250, thereby providing an estimated global position of the user 250. It should be noted that spatial positions within the map 300 may be correlated with GPS coordinates, as represented in map 300 of FIG. 3 by the axes indicating latitude, longitude, and altitude.

The correlation between the spatial positions within the map 300 and GPS coordinates may be established in various ways, such as during a pre-mapping process (e.g., recording GPS coordinates for systems that capture keyframes 320 and/or anchor points for constructing the map 300), manual overlay of GPS coordinates onto the map 300, and/or other ways. Thus, the estimated global position of the user 250 within the environment 200 may indicate an estimated position 360 of the user 250 relative to the map 300.

Furthermore, in some implementations, the IMU data 265 indicates the estimated orientation 365 relative to the map 300. For example, the IMU data 265 may comprise heading data obtained by compass(es) 180 (e.g., relative to a north vector), which may indicate an estimated heading or yaw of the system associated with the user 250. The IMU data 265 may also comprise an estimated pitch and roll of the system based on angular velocity data obtained by gyroscope(s) 175 (integrated over time to obtain rotation angles) and a gravity vector obtained by accelerometer(s) 170 (e.g., to address drift). FIG. 3 illustrates a gravity vector and a north vector in association with map 300, indicating that the map 300 may be correlated with the reference directions used to generate the estimated orientation 365.

Figure 4:
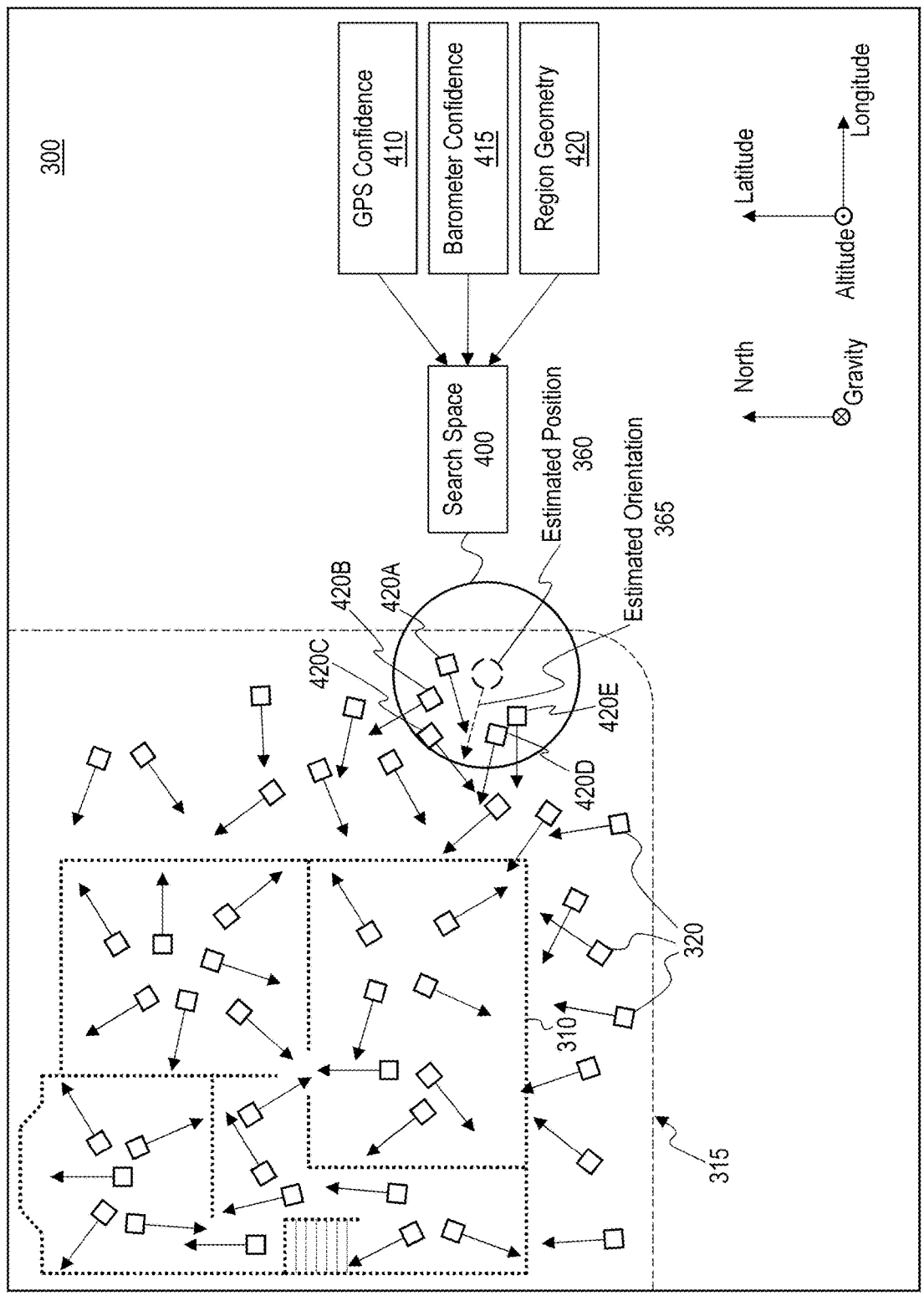
FIG. 4 illustrates an example of defining a search space within the map of FIG. 3 based on an estimated position of the mixed-reality system.

The estimated position 360 and/or the estimated orientation 365 may provide a basis for identifying a subset of keyframes 320 of the map 300 that a system searches through for localization. FIG. 4 illustrates an example of defining a search space 400 within the map 300. As is evident in FIG. 4, the search space 400 is defined based on and/or about the estimated position 360 of the system associated with the user 250, described hereinabove.

The search space 400 identifies one or more keyframes of the plurality of keyframes 320 of the map 300 that were captured from positions within the environment 200 that correspond to the search space 400. For example, FIG. 4 shows that keyframes 420A, 420B, 420C, 420D, and 420E are identified as within the search space 400 defined based on the estimated position 360. In this way, a system uses the estimated position 360 to select keyframes (e.g., keyframes 420A, 420B, 420C, 420D, and 420E) that were captured from locations in environment 200 that are within proximity to the position of the user 250 within the environment 200. The keyframes 420A, 420B, 420C, 420D, and 420E may comprise a subset of keyframes 320 that the system associated with the user 250 may utilize as candidates for localizing the system upon entry into the region 215 of the environment 200, represented as region 315 in the map 300.

Accordingly, in some instances, the system associated with the user 250 reduces or limits a search space to include only a subset (rather than all) of the keyframes 320 of the map 300 for performing localization. Thus, the system may reduce latency and/or computational burden associated with localizing the system relative to the region 215 of the environment 200. Furthermore, in some instances, utilizing only a subset of keyframes (e.g., keyframes 420A, 420B, 420C, 420D, and 420E) for localization reduces the chance of false localization (e.g., where an identified keyframe of highest correspondence is associated with a location within the environment 200 that is remote from the current position of the user 250 within the environment 200).

The size and shape of the search space 400 represented in FIG. 4 is provided as an example only, and other sizes and/or shapes are within the scope of this disclosure. A search space 400 can comprise any suitable shape (e.g., a sphere, cylinder, various prism, etc.) of any suitable size. Furthermore, in some implementations, the size and/or shape of the search space 400 is intelligently determined based on various factors. For example, in some instances, a system associated with the user defines a size and/or shape of the search space 400 based on a confidence measure associated with the GPS data 260, represented in FIG. 4 as GPS confidence 410.

A high degree of GPS confidence 410 may result in a smaller search space 400 (e.g., within a range of about three meters to about two meters or less in length or diameter), whereas a low degree of GPS confidence 410 may result in a larger search space 400 (e.g., within a range of about three to seven meters or more in length or diameter).

Confidence measures associated with GPS data 260 (or other radio-based positioning data) may include one or more of a signal to noise ratio, a number of GNSS formats available to the radio-based positioning device, the radio frequency bands employed by the radio-based positioning device, antenna characteristics, a number of simultaneous GNSS receive channels available to the radio-based positioning device (e.g., the number of satellites in view), the positioning of the satellites in view, the operational mode of the radio-based positioning device, the algorithm used in the radio-based positioning device (e.g., unscented Kalman filter, alpha-beta filter, position averaging filter, one-dimensional Kalman filter), the type of error correction algorithm(s) employed by the radio-based positioning device, and/or others.

In some implementations, a system utilizes additional or alternative factors in determining the size and/or shape of the search space 400. In some implementations, a system may define the size and/or shape of the search space 400 based on the geometry or other characteristics of the portion of the environment 200 (or portion of the map 300 of the environment 200) proximate to the estimated position 360 of the user 250, represented in FIG. 4 as region geometry 420.

By way of example, in some instances, the keyframes 320 of the map 300 that are near (e.g., within a few meters of) the estimated position 360 of the user 250 may be associated with sparse or few anchor points 310 (e.g., for wide open areas of the environment 200 or areas of the environment 200 that include sparse or few identifiable structures such as edges or corners), which may cause the system to select a larger size for the search space 400. In other instances, the keyframes 320 of the map 300 that are near the estimated position 360 of the user 250 may be associated with dense anchor points (e.g., for indoor portions of the environment 200 or areas that include dense identifiable structures such as edges or corners), which may cause the system to select a smaller size for the search space 400.

Furthermore, in some instances, a size and/or shape of a search space 400 may at least partially depend on a confidence measure associated with the IMU data 265. For example, where a system defines a search space 400 at least partially based on altitude data obtained by barometer(s) 185 of IMU(s) 165 of the system associated with the user 250, a barometer confidence 415 may influence the size and/or shape of the search space 400.

Figure 5:
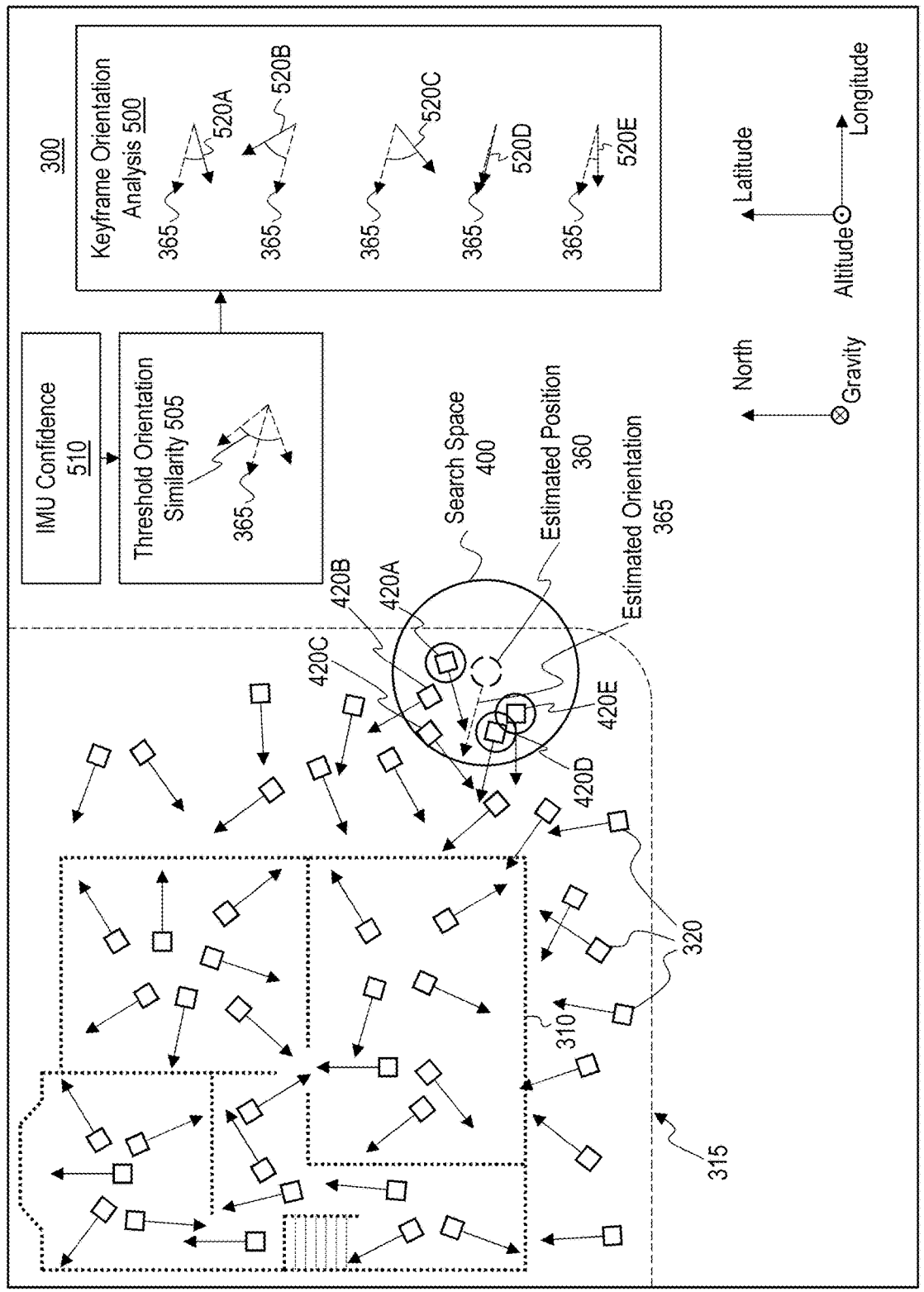
FIG. 5 illustrates an example of identifying a subset of keyframes within the search space of FIG. 4 based on orientation similarity to an estimated orientation of the mixed-reality system.

In addition to reducing the number of keyframes 320 of the map 300 used for localizing the system associated with the user 250 by defining a search space 400 and identifying a subset of keyframes within the search space 400 (e.g., keyframes 420A, 420B, 420C, 420D, and 420D) as described above, a system may employ additional or alternative techniques for further reducing the number of keyframes used to localize the system. FIG. 5 illustrates an example of identifying a subset of keyframes within the search space 400 based on the estimated orientation 365 described hereinabove.

As indicated above, each keyframe 320 of the map 300 may comprise an indication of the orientation from which the keyframe 320 was captured, shown in FIGS. 3-5 as arrows extending from each keyframe 320. Accordingly, the keyframes 420A, 420B, 420C, 420D, and 420D within the search space 400 include a keyframe orientation associated with each of the keyframes. A system may compare the estimated orientation 365 of the system associated with the user 250 to the keyframe orientations of the keyframes within the search space 400 (e.g., keyframes 420A, 420B, 420C, 420D, and 420D) to determine which subset of keyframes within the search space 400 to use as candidates for localization.

For instance, in some implementations, the system defines a threshold orientation similarity 505. The system may then perform a keyframe orientation analysis 500 to determine which keyframes within the search space 400 (e.g., keyframes 420A, 420B, 420C, 420D, and 420D) comprise an orientation that meets or exceeds the threshold orientation similarity 505. For example, as illustrated in FIG. 5, a keyframe orientation analysis 500 may include analyzing an orientation 520A of keyframe 420A to determine whether a difference between the orientation 520A and the estimated orientation 365 meets or exceeds the threshold orientation similarity 505. A keyframe orientation analysis 500 may comprise performing a similar analysis for other orientations associated with other keyframes, such as orientation 520B of keyframe 420B, orientation 520C of keyframe 420C, orientation 520D of keyframe 420D, and orientation 520D of keyframe 420D.

It should be noted that an orientation of a keyframe may "meet or exceed" a threshold orientation similarity 505 in various ways, depending on the format or definition of the threshold orientation similarity 505, which may be somewhat arbitrary. For example, a threshold orientation similarity 505 may indicate a maximum orientation difference value from the estimated orientation 365, as depicted in FIG. 5. In such examples, a difference between the estimated orientation 365 and an orientation of a particular keyframe that is greater than the maximum orientation difference value fails to meet or exceed the threshold orientation similarity 505, whereas a difference between the estimated orientation and an orientation of a particular keyframe that is equal to or less than the maximum orientation difference value meets or exceeds the threshold orientation similarity 505.

In the example shown in FIG. 5, a system determines via keyframe orientation analysis 500 that orientation 520A of keyframe 420A, orientation 520D of keyframe 420D, and orientation 520E of keyframe 420E meet or exceed the threshold orientation similarity 505, whereas orientation 520B of keyframe 420B and orientation 520C of keyframe 420C fail to meet or exceed the threshold orientation similarity 505. For instance, a difference between orientation 520A and the estimated orientation 365 may be equal to or less than a maximum orientation difference value indicated by the threshold orientation similarity 505, such that the keyframe 420A meets or exceeds the threshold orientation similarity 505.

Similarly, a difference between orientation 520D and the estimated orientation 365 may be equal to or less than a maximum orientation difference value indicated by the threshold orientation similarity 505, such that the keyframe 420D meets or exceeds the threshold orientation similarity 505.

Additionally, in some embodiments, a difference between orientation 520E and the estimated orientation 365 may be equal to or less than a maximum orientation difference value indicated by the threshold orientation similarity 505, such that the keyframe 420E meets or exceeds the threshold orientation similarity 505.

FIG. 5 illustrates a circle around each of keyframes 420A, 420D, and 420E within the search 400, indicating that keyframes 420A, 420D, and 420E may form a subset of keyframes that the system associated with the user 250 may utilize for localization.

In contrast, a difference between orientation 520B and the estimated orientation 365 may be greater than a maximum orientation difference value indicated by the threshold orientation similarity 505, such that the keyframe 420B fails to meet or exceed the threshold orientation similarity 505. Furthermore, a difference between orientation 520C and the estimated orientation 365 may be greater than a maximum orientation difference value indicated by the threshold orientation similarity 505, such that the keyframe 420C fails to meet or exceed the threshold orientation similarity 505. FIG. 5 omits a circle around each of keyframes 420B and 420C, indicating that the subset of keyframes that the system associated with the user 250 utilizes for localization may omit keyframes 420B and 420C.

Thus, FIG. 5 illustrates that a system may perform a keyframe orientation analysis 500 of the keyframes within the search space 400 (e.g., keyframes 420A, 420B, 420C, 420D, and 420E) to determine a subset of keyframes within the search space 400 to use for localization. Such techniques may allow a system to further reduce the number of candidate keyframes for localization, which may facilitate localization at reduced computational cost and/or latency.

Although FIG. 5 focuses, in some respects, on an example in which the threshold orientation similarity 505 is represented as a maximum orientation difference value, a threshold orientation similarity 505 may be represented in other ways without departing from the principles described herein. For example, a threshold orientation similarity 505 may indicate a range of orientation values that includes the estimated orientation 365, and a keyframe may meet or exceed the threshold orientation similarity 505 if the keyframe comprises an orientation that is within the range of orientation values indicated by the threshold orientation similarity 505.

In another example, a threshold orientation similarity 505 may indicate threshold dot product value, and a keyframe may meet or exceed the threshold orientation similarity 505 if the dot product between an orientation of the keyframe and the estimated orientation 365 is equal to or greater than the threshold dot product value. A threshold orientation similarity 505 may also take on other forms within the scope of this disclosure.

Importantly, it should be noted that a keyframe "meets or exceeds" a threshold orientation similarity 505 when an orientation of the keyframe is sufficiently similar to the estimated orientation 365.

FIG. 5 also illustrates that a threshold orientation similarity 505 may be defined or generated based on a confidence measure associated with IMU data 265, represented in FIG. 5 as IMU confidence 510. A system may determine IMU confidence 510 based on various factors, such as an amount of time that has elapsed or an amount of motion that has been sensed since tracking was lost within the environment 200 (e.g., for relocalization), an amount of detected acceleration, whether components of the IMU 165 were saturated, and/or others.

In some instances, where IMU confidence 510 is low, a system defines a broader threshold orientation similarity 505 to compensate for potential inaccuracy of the estimated orientation 365 (e.g., by defining a high maximum orientation difference value, defining a broad range of orientation values, defining a low threshold dot product value, etc.). In other instances, where IMU confidence is high a system may define a narrow threshold orientation similarity 505 (e.g., by defining a low maximum orientation difference value, defining a narrow range of orientation values, defining a high threshold dot product value, etc.), which may further improve efficiency of relocalization processing.

Accordingly, a system associated with the user 250 within the environment 200 may utilize an estimated position 360 (based on GPS data 260 and/or IMU data 265) and/or an estimated orientation 365 (based on IMU data 265) of the system to limit a localization search space within the map 300 of the environment 200 to identify a subset of keyframes 320 within the map 300 to use as candidate keyframes for localization. Thus, the system may refrain from using keyframes 320 of the map 300 that are not included in the subset of keyframes 320 as candidate keyframes for localization, which may improve efficiencies associated with localization within the environment 200.

Figure 6:
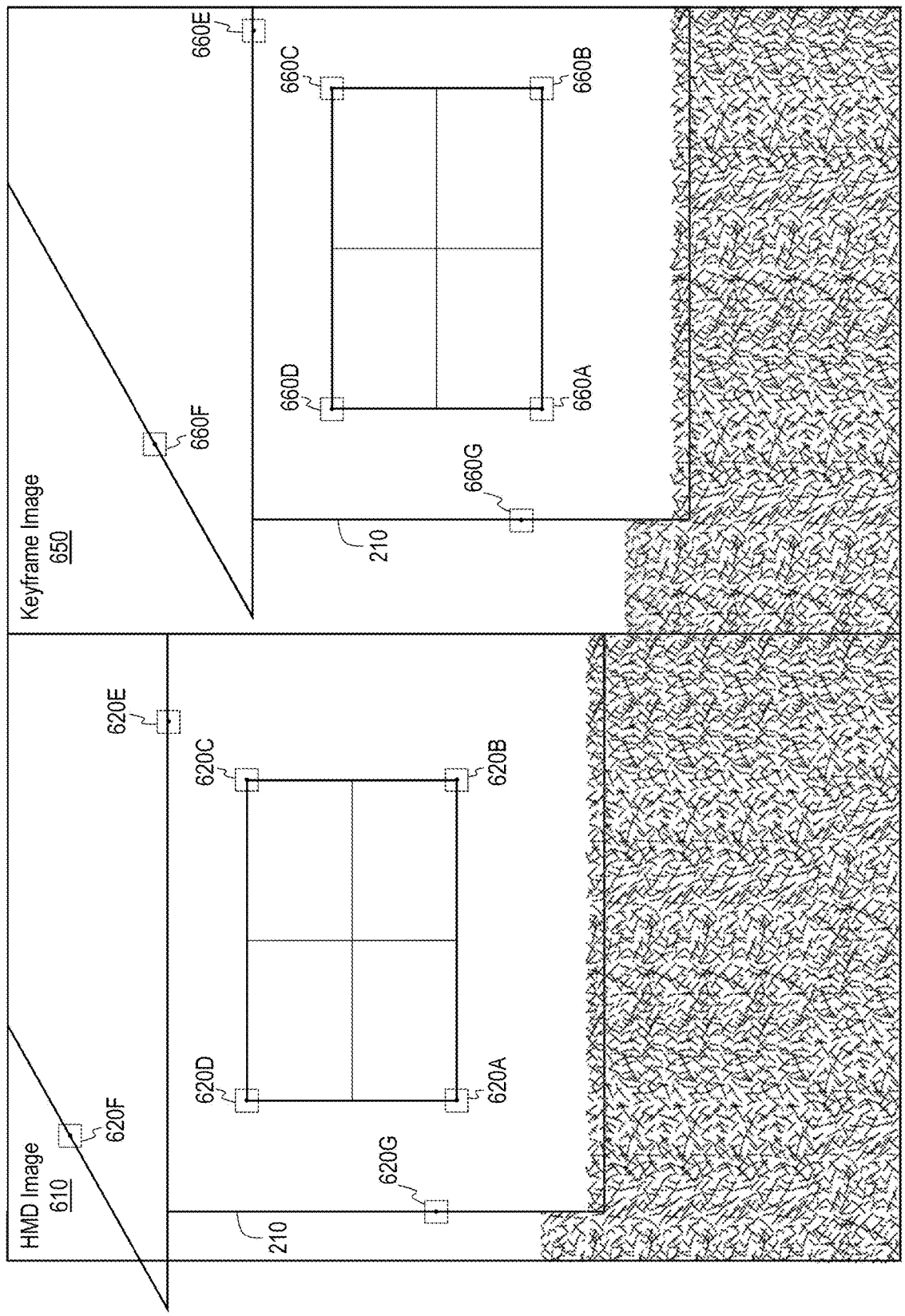
FIGS. 6 and 7 illustrate examples of identifying a keyframe of highest correspondence from the subset of keyframes from FIG. 5.

Continuing with the example shown in FIGS. 2-5, FIGS. 6 and 7 illustrate examples of identifying a keyframe of highest correspondence from the subset of keyframes (e.g., keyframes 420A, 420D, and 420E) identified as candidate keyframes for localization, as described hereinabove. As noted above, a system may identify a keyframe of highest correspondence as part of localizing or relocalizing the system within an environment (e.g., environment 200). FIG. 6 illustrates a keyframe image 650 captured by a system (e.g., HMD 100, user instrument 105, or another system) used to obtain visual mapping data to construct the map 300 of the environment 200.

As noted above, a keyframe 320 may be obtained based on one or more images of a captured portion of an environment (e.g., environment 200). In the example shown in FIG. 6, keyframe image 650 is an image captured by a system to add keyframe 420E to the map 300 of FIG. 4. Accordingly, keyframe image 650 captures a portion of the building 210 of the environment 200.

A system may extract features from keyframe image 650 to identify anchor points within the captured portion of the environment. FIG. 6 illustrates example anchor points 660A, 660B, 660C, 660D, 660E, 660F, and 660G. The anchor points 660A, 660B, 660C, 660D, 660E, 660F, and 660G may provide reference points for tracking pose changes of agents relative, and the anchor points 660A, 660B, 660C, 660D, 660E, 660F, and 660G may also facilitate localization or relocalization.

For example, FIG. 6 illustrates an HMD image 610, which represents image data 270 captured by the system associated with the user 250 while the user was located at position 250B within the environment 200. Thus, HMD image 610 also captures a portion of the building 210 of the environment 200.

When attempting to localize or relocalize, in some implementations, a system extracts feature points from the HMD image 610. FIG. 6 illustrates example feature points 620A, 620B, 620C, 620D, 620E, 620F, and 620G. In some instances, the system determines feature correspondences (e.g., performs feature matching) to identify one or more keyframes of the subset of keyframes (e.g., keyframes 420A, 420D, and 420E) that are associated with anchor points that correspond to the feature points identified from the HMD image 610.

A feature point and an anchor point correspond to one another when they both describe a same portion of an environment. In some instances, a system determines whether a feature point and an anchor point correspond to one another based on a comparison between a feature descriptor associated with the feature point and a feature descriptor associated with the anchor point.

In some instances, a feature descriptor (also referred to as a "feature vector") results from extracting image data/statistics from a local image/pixel patch around an identified feature point (or anchor point). A feature descriptor may operate as an identifier for the feature point about which the feature descriptor is centered. Various approaches exist for extracting feature descriptors, such as local histogram approaches, N-jets approaches, and/or others. For example, a feature descriptor may be identified based on a histogram of gradient magnitudes (e.g., changes in intensity and/or color) and/or orientations (e.g., edge orientations) for pixels within an image patch centered on a feature point (or anchor point).

FIG. 6 illustrates feature descriptors as dashed boxes that surround the various feature points (feature points 620A, 620B, 620C, 620D, 620E, 620F, and 620G) and anchor points (anchor points 660A, 660B, 660C, 660D, 660E, 660F, and 660G).

In the example shown in FIG. 6, the system associated with the user 250 compares feature descriptors of the feature points of the HMD image 610 (e.g., feature points 620A, 620B, 620C, 620D, 620E, 620F, and 620G) to the anchor points of the keyframe image 650 (e.g., anchor points 660A, 660B, 660C, 660D, 660E, 660F, and 660G). The system determines that, for example, feature points 620A, 620B, 620C, and 620D describe the same corners of the window of the building 210 as anchor points 660A, 660B, 660C, and 660D, respectively, feature points 620E and 620F describe the same portions of the roof of the building 210 as anchor points 660E and 660F, respectively, and feature point 620G describes the same vertical edge portion of the building 210 as anchor point 660G. (It is noted that anchor points 660A, 660B, 660C, 660D, 660E, 660F, and 660G correspond to the premapping of the environment, such as through keyframe 420E of FIGS. 4-5, or other keyframes).

The system may also compare the feature descriptors of the feature points of the HMD image 610 to anchor points associated with other keyframes of the subset of keyframes (e.g., keyframes 420A and 420D) to determine a keyframe of highest correspondence to the HMD image 610. In some implementations, a keyframe of highest correspondence is identified based on a number of anchor points associated therewith that correspond to the feature points of the HMD image 610, based on one or more similarity measures between one or more of the feature descriptors associated with the anchor points of the keyframe and one or more feature descriptors associated with the feature points of the HMD image 610, and/or other factors. By way of example, the system may determine that keyframe 420D is the keyframe of highest correspondence.

As noted above, a position and orientation of the keyframe of highest correspondence may be stored within the map 300. Accordingly, the system associated with the user 250 may estimate the position and orientation (e.g., the pose) of the HMD 100 relative to the environment based on at least the position and orientation of the keyframe of highest correspondence and/or the anchor points associated with the keyframe of highest correspondence, thereby localizing or relocalizing the HMD 100 relative to the map 300 of the environment 200.

FIG. 6 focuses, in at least some respects, on localizing the HMD 100 of the user 250 at position 250B within the environment 200 using at least the HMD image 610 and the subset of keyframes described hereinabove (e.g., keyframes 420A, 420B, and 420E). However, at least some of the principles described herein may be applied to localize a user instrument 105 associated with the HMD 100 (and/or the user 250). For example, the sensor(s) 190 of a user instrument 105 of the user 250 may comprise dedicated camera(s), IMU(s), and GPS(s), such that the techniques and principles described herein for localization and relocalization may be applied to the user instrument 105 independent of the HMD 100.

In other instances, the sensor(s) 190 of the user instrument 105 may comprise dedicated camera(s) and IMU(s) but omit a GPS. However, in some instances, GPS(s) 160 mounted on the HMD 100 may be leveraged for localizing or relocalizing the user instrument 105, in addition to localizing or relocalizing the HMD 100. For example, in some instances, a system associated with the user 250 may operate on an assumption that the user instrument 105 is within a predetermined distance to the HMD 100 (e.g., within a few meters or less). Accordingly, an estimated position of the HMD 100 determined based on GPS data associated with the HMD 100 may be used to define a search space to identify a subset of keyframes for localizing the user instrument 105.

In some instances, the search space for localizing the user instrument 105 may be broadened to account for the lack of a dedicated GPS mounted on the user instrument 105. The system may then utilize IMU data specific to the user instrument 105 to further narrow the subset of keyframes based on an estimated orientation of the user instrument 105 (e.g., in the manner described hereinabove with reference to FIG. 5).

Figure 7:
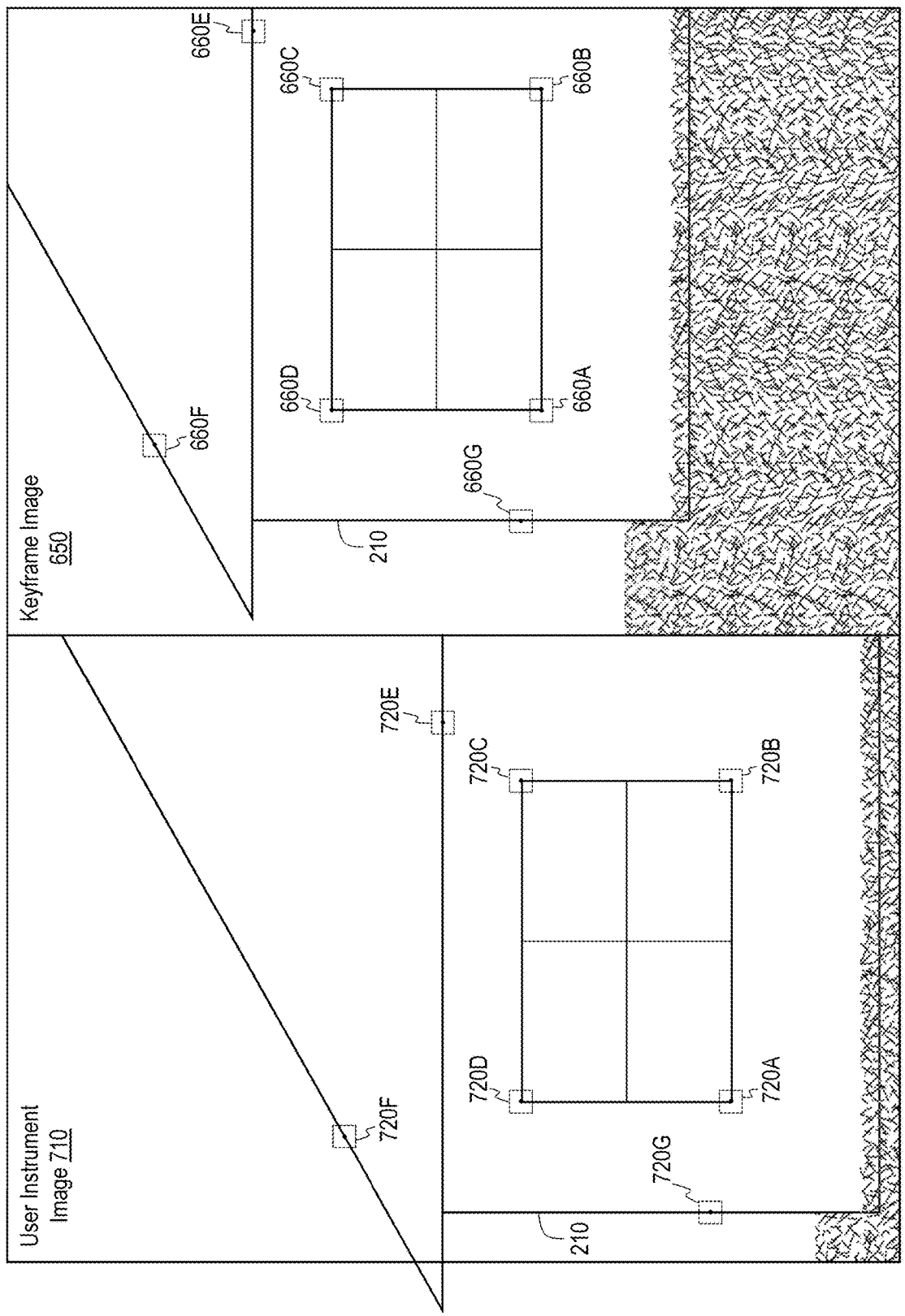

One will appreciate that the subset of keyframes for localizing the user instrument 105 may at least partially differ from the subset of keyframes for localizing the HMD 100. For example, FIG. 7 illustrates a user instrument image 710 captured by one or more cameras of the user instrument 105. As is evident from FIG. 7, the perspective from which the user instrument 105 captures the building 210 in the user instrument image 710 differs from the perspective from which the HMD 100 captures the building 210 in the HMD image 610. Thus, a different estimated orientation may apply to the user instrument 105 as compared to the estimated orientation of the HMD 100. Thus, different keyframes may be considered to be sufficiently similar in orientation to the estimated orientation of the user instrument 105 as compared to the estimated orientation of the HMD 100.

After identifying a subset of keyframes to use for localizing the user instrument 105, a system may identify feature points (e.g., feature points 720A, 720B, 720C, 720D, 720E, 720F, 720G) within a user instrument image 710 captured by one or more cameras of the user instrument 105, as shown in FIG. 7. The system may then compare feature descriptors of the feature points of the user instrument image 710 to the anchor points of the keyframe image 650 (e.g., anchor points 660A, 660B, 660C, 660D, 660E, 660F, and 660G). The system determines that, for example, feature points 720A, 720B, 720C, and 720D describe the same corners of the window of the building 210 as anchor points 660A, 660B, 660C, and 660D, respectively, feature points 720E and 720F describe the same portions of the roof of the building 210 as anchor points 660E and 660F, respectively, and feature point 720G describes the same vertical edge portion of the building 210 as anchor point 660G.

The system may also compare the feature descriptors of the feature points of the user instrument image 710 to anchor points associated with other keyframes of the subset of keyframes for localizing the user instrument 105 to determine a keyframe of highest correspondence to the user instrument image 710. The system may then estimate the position and orientation (e.g., the pose) of the user instrument 105 relative to the environment based on at least the position and orientation of the keyframe of highest correspondence and/or the anchor points associated with the keyframe of highest correspondence, thereby localizing or relocalizing the user instrument 105 relative to the map 300 of the environment 200.

In some instances, after identifying a subset of keyframes to localize the HMD 100 or the user instrument 105 by defining a search space 400 within the map 300, a system associated with the user 250 may fail to localize or relocalize the HMD 100 or the user instrument 105 based on the keyframes of the identified subset of keyframes. Thus, in some implementations, the system is configured to modify the search space 400 to identify additional keyframes 320 as candidates for localization. For example, a system may increase the size of the search space 400 in response to failing to localize or relocalize.

As indicated above with reference to FIG. 2, a system associated with the user 250 (e.g., the HMD 100, the user instrument 105, and/or another system) may obtain tracking data 255 (comprising GPS data 260, IMU data 265, and image data 270) while the user is at position 250B within the environment 200. In some implementations, the system associated with the user 250 is configured to selectively transition between different tracking modes within the environment.

In some instances, selectively transitioning between different tracking modes may avoid unnecessary data acquisition and thereby save battery and/or computational resources. For example, FIG. 8 illustrates the environment 200 from FIG. 2, depicting the user 250 moving from position 250A within the wooded area 205 of the environment to position 250B of region 215 of the environment 200.

As indicated hereinabove, a map 300 of the environment 200 may omit visual mapping data for facilitating localization within the wooded area 205 of the environment. Accordingly, FIG. 8 illustrates that a system associated with the user 250 may track the position of the system within the environment 200 using a first tracking mode 810 while the user is positioned within the wooded area 205 of the environment 200.

Figure 8:
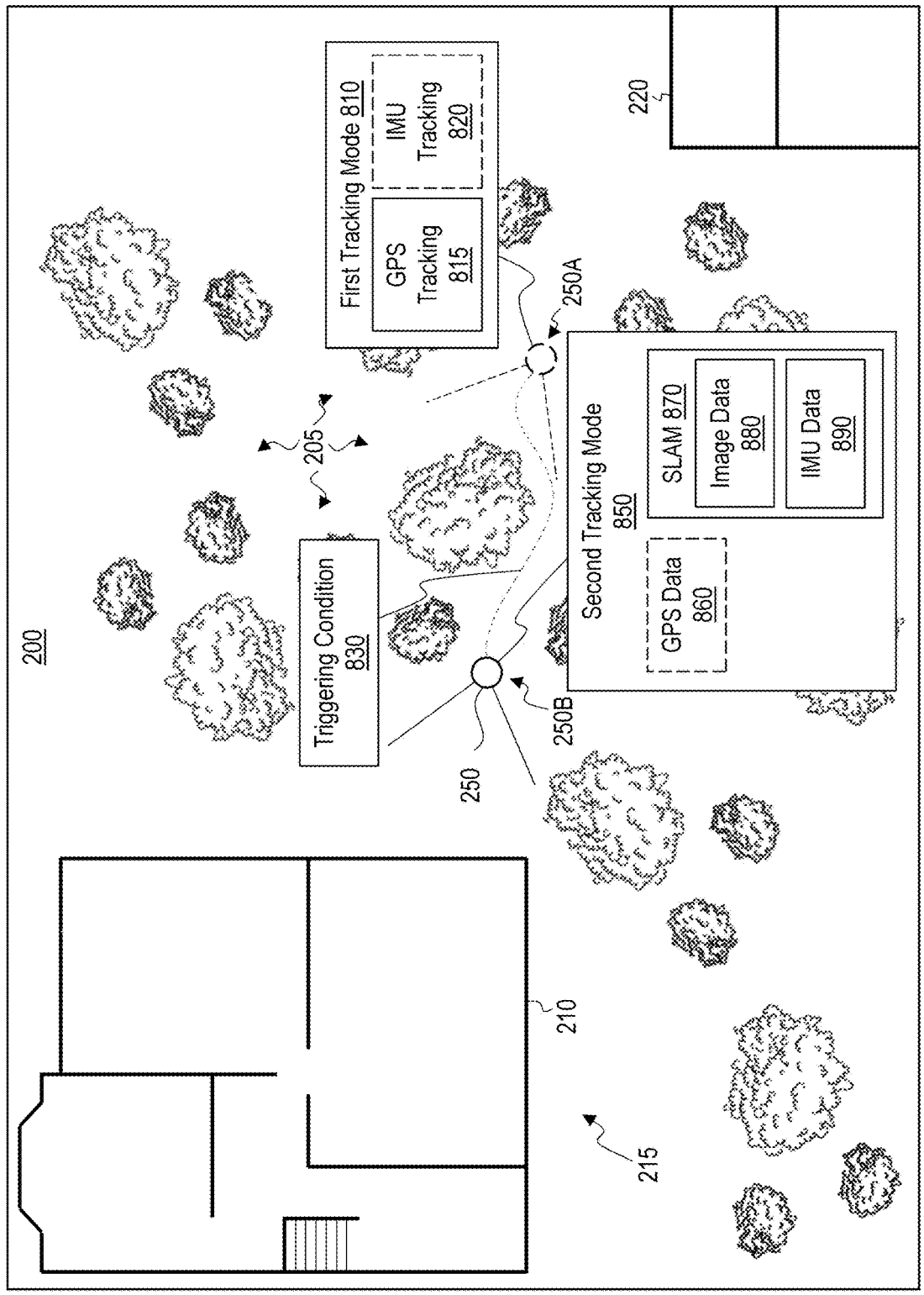
FIG. 8 illustrates an example of transitioning between tracking modes within the environment of FIG. 2.

In some instances, the first tracking mode 810 comprises GPS tracking 815 (the first tracking mode 810 may, in some instances, comprise IMU tracking 820, indicated in FIG. 8 with dashed lines). In some implementations, when operating under the first tracking mode 810, the system refrains from performing operations associated with SLAM, such as capturing image data, extracting features, performing depth calculations, tracking frame-to-frame 6DOF pose, etc., thereby saving on computational and/or battery resources. For example, the system may rely on GPS tracking 815 to maintain coarse positional awareness of the system relative to the environment 200, and the system may refrain from obtaining image data while the GPS tracking 815 indicates that the system is substantially within the wooded area 205 (e.g., because localization within the wooded area may be hindered in view of the map 300 omitting visual mapping data for the wooded area 205).

It will be appreciated, in view of the present disclosure, that the system may operate in under the first tracking mode 810 in other portions of the environment 200 for which visual mapping data does exist or is not intended for use.

As the user 250 transitions from position 250A within the wooded area 205 of the environment 200 to position 250B within region 215 of the environment 200, the system associated with the user may detect a triggering condition 830. In some implementations, the triggering condition 830 is configured for selectively switching from the first tracking mode 810 to a second tracking mode 850. In some instances, the second tracking mode 850 comprises a high-fidelity tracking mode relative to the first tracking mode 810. For example, the second tracking mode 850 may comprise SLAM 870, which utilizes image data 880 and IMU data 890 to track 6DOF pose of the system with centimeter or millimeter precision (e.g., in contrast to GPS tracking 815 of the first tracking mode 810, which provides global position tracking of the system precision in the range of a few meters). The second tracking mode 850 may, in some instances, utilize GPS data 860, indicated in FIG. 8 with dashed lines.

In some implementations, the triggering condition 830 is at least partially based on data obtained via GPS tracking 815 according to the first tracking mode 810 (and/or other tracking data obtained via the first tracking mode 810). For example, in some instances, the triggering condition includes determining that an estimated position of the system (e.g., an estimated position based on GPS tracking 815) is within a threshold proximity to a particular portion of the environment 200 or map 300 of the environment 200.

In some instances, the particular portion of the environment 200 or map 300 of the environment 200 is a target region within the environment, which may comprise a pre-mapped region of the environment 200 for which a map 300 of the environment 200 includes visual mapping data (e.g., region 215 of the environment 200, for which map 300 comprises keyframes 320 and anchor points 310).

As noted above, a map 300 of the environment may be correlated with GPS coordinates, such that the system may determine the global position of the system relative to keyframes, anchor points, and/or other data represented in the map 300. Thus, in some implementations, a triggering condition 830 comprises a determination that one or more keyframes 320 and/or anchor points 310 stored within a map 300 of the environment are within a threshold proximity to a global position of the system obtained via GPS tracking 815 under the first tracking mode 810 (e.g., a determination that one or more keyframes 320 are within a search space 400 for the system based on an updateable estimated position 360 of the system).

In some instances, in response to detecting the presence of the triggering condition 830 described above, the system associated with the user 250 may selectively activate the second tracking mode 850 and thereafter continue to track a high-fidelity position (e.g., a 6DOF pose) of the system relative to the environment 200 using the second tracking mode 850 (e.g., via SLAM 870). In some instances, upon activating the second tracking mode 850, obtains image data 880 and IMU data 890 to localize itself relative to the environment 200 by defining a search space 400 based on an estimated position 360 of the system (based on GPS data 860) and identifying a subset of keyframes 320 within the search space 400 based on an estimated orientation 365 of the system (based on IMU data 890) as candidate keyframes for localization.

Although FIG. 8 focuses, in at least some respects, on selectively transitioning between tracking modes for a system associated with user 250 (e.g., HMD 100 and/or user instrument 105), the principles described herein may be applicable to other devices. For example, a drone or other autonomous device may operate under a first tracking mode 810 while flying through the air in transit to a target region (e.g., a landing or delivery region). Then, based on tracking data obtained under the first tracking mode, the drone may determine, as a triggering condition 830, that the drone has entered or is within sufficient proximity to the target region (e.g., the drone may have entered a target region of GPS coordinates). In response to the triggering condition, the drone may activate a second tracking mode 850 and enable SLAM to provide high-fidelity tracking functionality (e.g., to enable the drone to land relative to structures within the environment and/or accurately deliver a package).

Example Method(s) for GPS- and Sensor-Based Relocalization

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
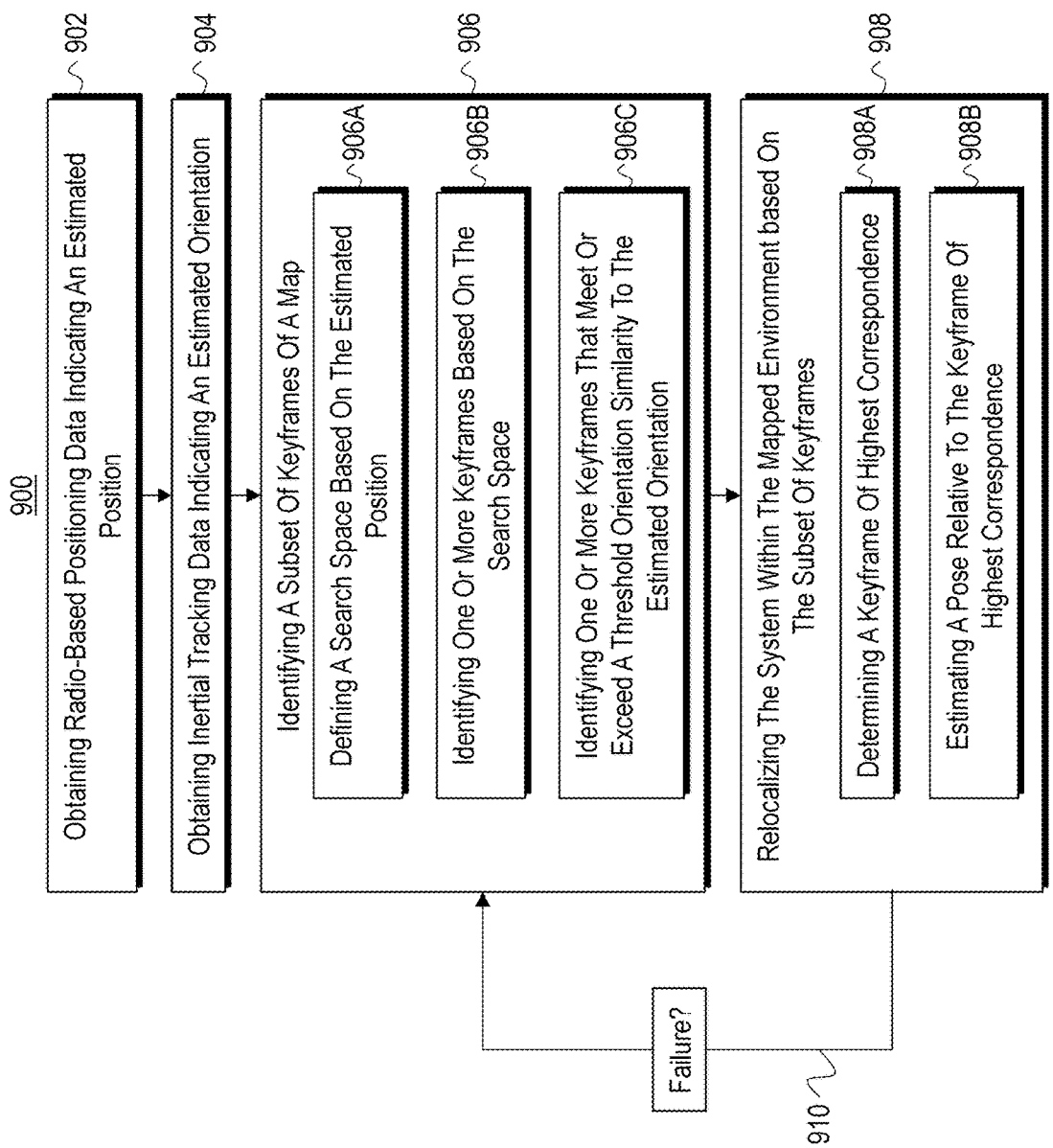
FIG. 9 illustrates an example flow diagram depicting acts associated with facilitating relocalization within a mapped environment.

FIG. 9 illustrates an example flow diagram 900 depicting acts associated with methods for facilitating relocalization within a mapped environment. The discussion of the various acts represented in flow diagram 900 includes references to various hardware components described in more detail with reference to FIGS. 1 and 11.

Act 902 of flow diagram 900 includes obtaining radio-based positioning data indicating an estimated position. Act 902 is performed, in some instances, using GPS(s) 160 and/or one or more processor(s) 1105 (e.g., of an HMD 100, a user instrument 105, and/or another system). In some instances, the radio-based positioning data comprises global positioning system (GPS) data obtained by a GPS device associated with the system. In some instances, the estimated position indicated by the radio-based positioning data is a position relative to a map of a mapped environment.

Act 904 of flow diagram 900 includes obtaining inertial tracking data indicating an estimated orientation. Act 904 is performed, in some instances, using IMU(s) 165 and/or one or more processor(s) 1105 (e.g., of an HMD 100, a user instrument 105, and/or another system). In some instances, the inertial tracking data is obtained by one or more inertial tracking components, such as accelerometer(s) 170, gyroscope(s) 175, compass(es) 180, and/or barometer(s) 185, which may comprise components of IMU(s) 165. In some instances, the estimated orientation indicated by the inertial tracking data is an orientation relative to a map of a mapped environment.

Act 906 of flow diagram 900 includes identifying a subset of keyframes of a map. Act 906 is performed, in some instances, using one or more processor(s) 1105 (e.g., of an HMD 100, a user instrument 105, and/or another system). In some instances, the subset of keyframes of the map are identified based on the estimated position and/or the estimated orientation. The map may comprise a map of a mapped environment and may comprise a plurality of keyframes captured from a plurality of locations within the mapped environment. The plurality of keyframes is, in some instances, associated with anchor points identified within the mapped environment.

Identifying a subset of keyframes of a map according to act 906 may include various acts. For example, flow diagram 900 illustrates that act 906A includes defining a search space based on the estimated position. In some implementations, defining the search space is based on a confidence measure associated with the radio-based positioning data. Also, in some instances, defining of the search space is based on a geometry of a region of the mapped environment proximate to the estimated position. Additionally, or alternatively, in some instances, the search space is defined based on barometer data.

Act 906B includes identifying one or more keyframes based on the search space. In some instances, the one or more keyframes are captured from one or more positions within the mapped environment that correspond to the search space.

Act 906C includes identifying one or more keyframes that meet or exceed a threshold orientation similarity to the estimated orientation. In some instances, the threshold orientation similarity comprises a maximum orientation difference value. In some instances, the threshold orientation similarity comprises a range of orientation values. In some instances, the threshold orientation similarity comprises a dot product value. In some implementations, the threshold orientation similarity is based on a confidence measure associated inertial tracking data.

Act 908 of flow diagram 900 includes relocalizing the system within the mapped environment based on the subset of keyframes. Act 908 is performed, in some instances, using one or more processor(s) 1105 (e.g., of an HMD 100, a user instrument 105, and/or another system). Act 908 may also comprise refraining from relocalizing the system within the mapped environment based on keyframes of the plurality of keyframes of the map that are not included in the subset of keyframes, thereby reducing computational cost and/or latency.

Relocalizing the system within the mapped environment based on the subset of keyframes according to act 908 may include various acts. For example, flow diagram 900 illustrates that act 908A includes determining a keyframe of highest correspondence. In some instances, determining a keyframe of highest correspondence comprises determining feature correspondences between the one or more visual tracking images and anchor points associated with each keyframe of the subset of keyframes.

Act 908B includes estimating a pose relative to the keyframe of highest correspondence. For example, the pose may be estimated relative to an orientation and position associated with the keyframe of highest correspondence, and/or relative to one or more anchor points associated with the keyframe of highest correspondence.

Flow diagram 900 illustrates arrow 910 extending from act 908 to act 906, indicating that, in some instances, in response to failing to relocalize the system within the mapped environment based on the subset of keyframes, a system may modify the subset of keyframes to include additional keyframes of the plurality of keyframes.

Figure 10:
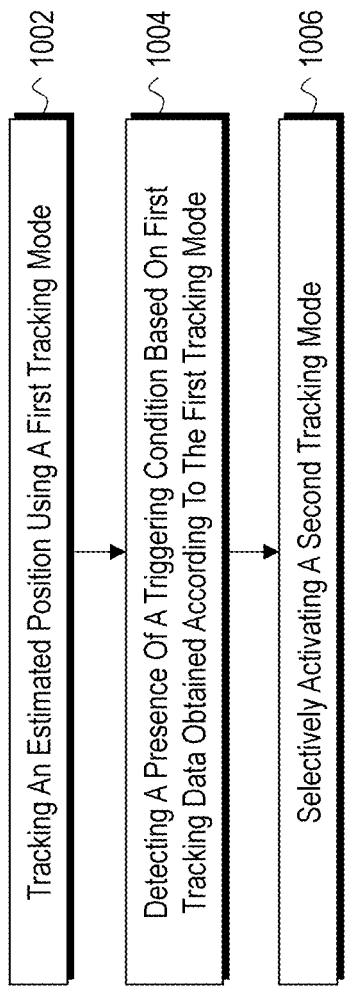
FIG. 10 illustrates an example flow diagram depicting acts associated with transitioning between tracking modes within an environment.

FIG. 10 illustrates an example flow diagram 1000 depicting acts associated with transitioning between tracking modes within an environment. The discussion of the various acts represented in flow diagram 900 includes references to various hardware components described in more detail with reference to FIGS. 1 and 11.

Act 1002 of flow diagram 1000 includes tracking an estimated position using a first tracking mode. Act 1002 is performed, in some instances, using sensor(s) 150 and/or 190 and/or one or more processor(s) 1105 (e.g., of an HMD 100, a user instrument 105, and/or another system). In some instances, the first tracking mode comprises GPS tracking.

Act 1004 of flow diagram 1000 includes detecting a presence of a triggering condition based on first tracking data obtained according to the first tracking mode. Act 1004 is performed, in some instances, using sensor(s) 150 and/or 190 and/or one or more processor(s) 1105 (e.g., of an HMD 100, a user instrument 105, and/or another system). In some instances, the triggering condition is at least partially based on first tracking data obtained according to the first tracking mode (e.g., GPS data).

In some instances, the triggering condition is operable for selectively switching from the first tracking mode to a second tracking mode of the system. In some instances, the second tracking mode comprises a high-fidelity tracking mode relative to the first tracking mode. For example, in some instances, the second tracking mode comprises simultaneous localization and mapping (SLAM). In some implementations, the triggering condition comprises a determination that the estimated position of the system tracked using the first tracking mode of the system is within a threshold proximity to either (1) a target region within the environment or (2) a pre-mapped portion of the environment.

Act 1006 of flow diagram 1006 includes selectively activating a second tracking mode. Act 1006 is performed, in some instances, using sensor(s) 150 and/or 190 and/or one or more processor(s) 1105 (e.g., of an HMD 100, a user instrument 105, and/or another system). In some instances, selectively activating the second tracking mode is performed in response to detecting the presence of the triggering condition. As noted above, the second tracking mode may comprise simultaneous location and mapping (SLAM). In some instances, activating the second tracking mode includes tracking a position of the system within the environment using the second tracking mode. Tracking the position of the system within the environment using the second tracking mode comprises localizing the system within the environment based on one or more keyframes associated with the pre-mapped portion of the environment.

Example Computer System(s)

Figure 11:
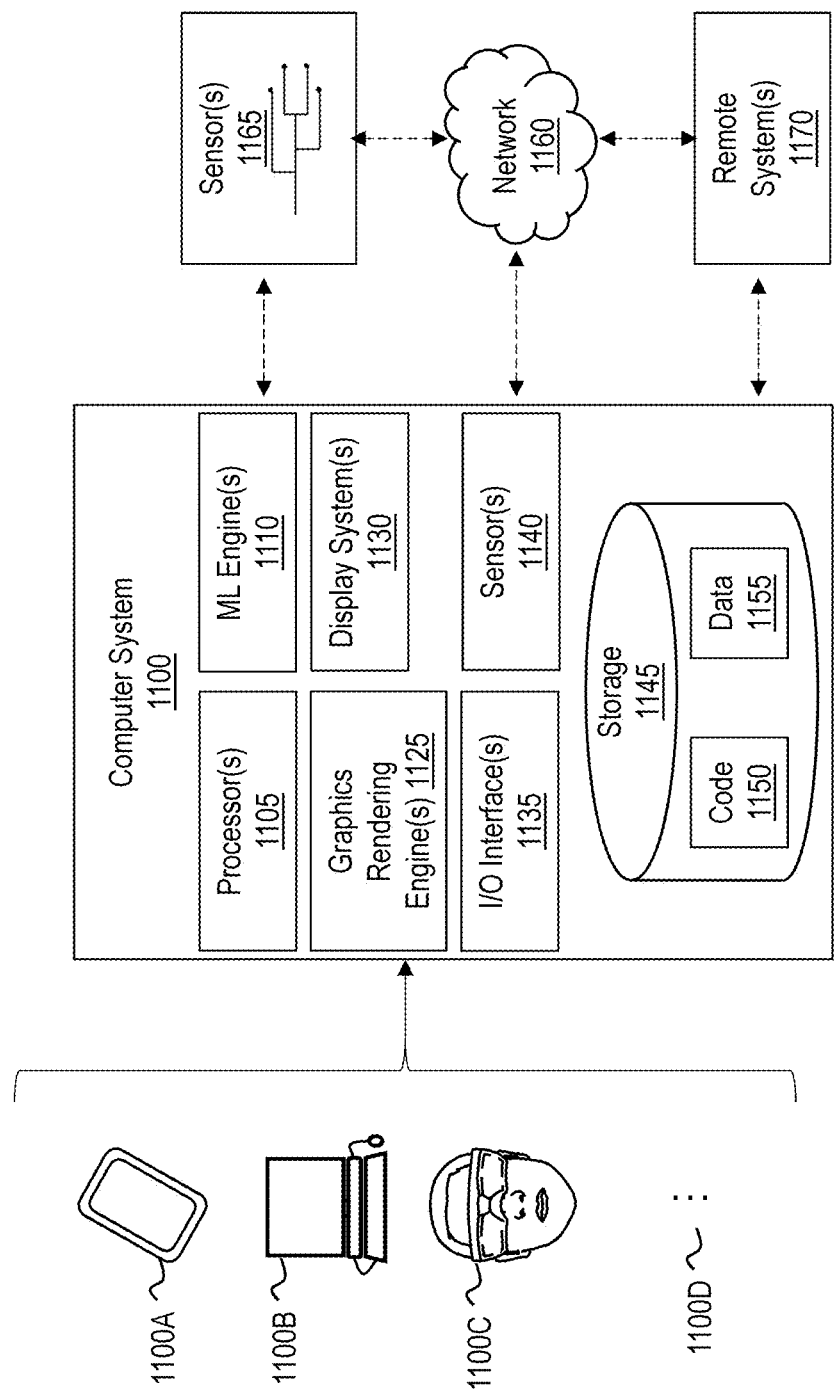
FIG. 11 illustrates an example computer system that may include and/or be used to perform disclosed embodiments.

Having just described the various features and functionalities of some of the disclosed embodiments, the focus will now be directed to FIG. 11 which illustrates an example computer system 1100 that may include and/or be used to facilitate the embodiments described herein, including the acts described in reference to the foregoing Figures. In some implementations, this computer system 1100 may be implemented as part of a mixed-reality HMD, or any other systems described herein.

Computer system 1100 may take various different forms. For example, computer system 1100 may be embodied as a tablet, a desktop, a laptop, a mobile device, a cloud device, an HMD, or a standalone device, such as those described throughout this disclosure. Computer system 1100 may also be a distributed system that includes one or more connected computing components/devices that are in communication with computer system 1100. FIG. 11 specifically calls out how computer system 1100 may be embodied as a tablet 1100A, a laptop 11006, or an HMD 1100C, but the ellipsis 1100D indicates that computer system 1100 may be embodied in other forms as well.

The computer system 1100 includes various different components. FIG. 11 shows that computer system 1100 includes one or more processors 1105 (aka a "hardware processing unit"), a machine learning (ML) engine 1110, graphics rendering engine(s) 1125, a display system 1130, input/output (I/O) interfaces 1135, one or more sensors 1140, and storage 1145.

Regarding the processor(s) 1105, it will be appreciated that the functionality described herein can be performed, at least in part, by one or more hardware logic components (e.g., the processor(s) 1105). For example, and without limitation, illustrative types of hardware logic components/processors that can be used include Field-Programmable Gate Arrays ("FPGA"), Program-Specific or Application-Specific Integrated Circuits ("ASIC"), Application-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1100. The different components, modules, engines, and services described herein may be implemented as objects or processors that execute on computer system 1100 (e.g. as separate threads).

The ML engine 1110 may be implemented as a specific processing unit (e.g., a dedicated processing unit as described earlier) configured to perform one or more specialized operations for the computer system 1100. The ML engine 1110 (or perhaps even just the processor(s) 1105) can be configured to perform any of the disclosed method acts or other functionalities.

In some instances, the graphics rendering engine 1125 is configured, with the hardware processing unit 1105, to render one or more virtual objects within the scene. As a result, the virtual objects accurately move in response to a movement of the user and/or in response to user input as the user interacts within the virtual scene. The computer system 1100 may include a display system 1130 (e.g., laser diodes, light emitting diodes (LEDs), microelectromechanical systems (MEMS), mirrors, lens systems, diffractive optical elements (DOES), display screens, and/or combinations thereof) for presenting virtual objects within the scene.

I/O interface(s) 1135 includes any type of input or output device. Such devices include, but are not limited to, touch screens, displays, a mouse, a keyboard, a controller, and so forth. Any type of input or output device should be included among I/O interface(s) 1135, without limitation.

During use, in some instances, a user of the computer system 1100 is able to perceive information (e.g., a mixed-reality environment) through a display screen that is included among the I/O interface(s) 1135 and that is visible to the user. The I/O interface(s) 1135 and sensors 1140/1165 may also include gesture detection devices, eye tracking systems, and/or other movement detecting components (e.g., head tracking cameras, depth detection systems, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The computer system 1100 may also be connected (via a wired or wireless connection) to external sensors 1165 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses.

Storage 1145 may be physical system memory, which may be volatile, non-volatile, or some combination of the two. The term "memory" may also be used herein to refer to non-volatile mass storage such as physical storage media. If computer system 1100 is distributed, the processing, memory, and/or storage capability may be distributed as well.

Storage 1145 is shown as including executable instructions (i.e. code 1150). The executable instructions (i.e. code 1150) represent instructions that are executable by the processor(s) 1105 of computer system 1100 to perform the disclosed operations, such as those described in the various methods. Storage 1145 is also shown as including data 1155. Data 1155 may include any type of data, including image data, depth/disparity maps and/or other depth data, pose data, tracking data, and so forth, without limitation.

The disclosed embodiments may comprise or utilize a special-purpose or general-purpose computer including computer hardware, such as, for example, one or more processors (such as processor(s) 1105) and system memory (such as storage 1145), as discussed in greater detail below.

Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1100 may also be connected (via a wired or wireless connection) to external sensors (e.g., one or more remote cameras) or devices via a network 1160. For example, computer system 1100 can communicate with any number devices or cloud services to obtain or process data. In some cases, network 1160 may itself be a cloud network. Furthermore, computer system 1100 may also be connected through one or more wired or wireless networks 1160 to remote/separate computer systems(s) 1170 that are configured to perform any of the processing described with regard to computer system 1100.

A "network," like network 1160, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1100 will include one or more communication channels that are used to communicate with the network 1160. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for facilitating relocalization within a mapped environment, the system comprising:
    one or more processors; and
    one or more hardware storage devices storing computer-executable instructions that are executable by the one or more processors to configure the system to facilitate relocalization within a mapped environment and by at least configuring the system to perform the following:
        obtain radio-based positioning data indicating an estimated position of the system within the mapped environment;
        identify, based on the estimated position, a subset of keyframes of a map of the mapped environment, the map of the mapped environment comprising a plurality of keyframes captured from a plurality of locations within the mapped environment, the plurality of keyframes being associated with anchor points identified within the mapped environment; and
        relocalize the system within the mapped environment based on the subset of keyframes.

2. The system of claim 1, wherein the radio-based positioning data comprises global positioning system (GPS) data obtained by a GPS device associated with the system.

3. The system of claim 2, wherein the system comprises a head-mounted display (HMD).

4. The system of claim 2, wherein:
    the system comprises a user instrument associated with an HMD,
    the GPS device is mounted on the HMD, and
    the user instrument omits a separate GPS device mounted thereon.

5. The system of claim 1, wherein identifying the subset of keyframes of the map of the mapped environment comprises:
    defining a search space within the map based on the estimated position; and
    identifying one or more keyframes of the plurality of keyframes, the one or more keyframes being captured from one or more positions within the mapped environment that correspond to the search space.

6. The system of claim 5, wherein the defining of the search space is based on barometer data associated with the system for defining an altitude of the search space.

7. The system of claim 5, wherein the defining of the search space is based on a confidence measure associated with the radio-based positioning data.

8. The system of claim 5, wherein the defining of the search space is based on a geometry of a region of the mapped environment proximate to the estimated position.

9. The system of claim 5, wherein the computer-executable instructions are executable by the one or more processors to configure the system to:
obtain an estimated orientation of the system based on inertial tracking data from one or more inertial tracking components associated with the system.

10. The system of claim 9, wherein the one or more inertial tracking components comprise an accelerometer, a magnetometer, or a gyroscope.

11. The system of claim 9, wherein identifying the subset of keyframes of the map of the mapped environment comprises:
identifying one or more keyframes within the search space that meet or exceed a threshold orientation similarity to the estimated orientation.

12. The system of claim 11, wherein the threshold orientation similarity is based on a confidence measure associated with the inertial tracking data.

13. The system of claim 1, wherein relocalizing the system within the mapped environment based on the subset of keyframes comprises:
determining a keyframe of highest correspondence to one or more visual tracking images captured by one or more cameras associated with the system, wherein determining the keyframe of highest correspondence comprises determining feature correspondences between the one or more visual tracking images and anchor points associated with each keyframe of the subset of keyframes; and
estimating a pose of the system within the mapped environment relative to the keyframe of highest correspondence.

14. The system of claim 1, wherein the computer-executable instructions are executable by the one or more processors to configure the system to refrain from relocalizing the system within the mapped environment based on keyframes of the plurality of keyframes of the map that are not included in the subset of keyframes.

15. The system of claim 1, wherein the computer-executable instructions are executable by the one or more processors to configure the system to, in response to failing to relocalize the system within the mapped environment based on the subset of keyframes, modify the subset of keyframes to include additional keyframes of the plurality of keyframes.

16. A system for determining a pose of a system relative to a mapped environment, the system comprising:
one or more processors; and
one or more hardware storage devices storing computer-executable instructions that are executable by the one or more processors to configure the system to determine a pose of a system relative to a mapped environment and by at least configuring the system to perform the following:
generate head tracking data associated with the system, the head tracking data being generated based on at least (1) visual tracking data obtained using one or more cameras associated with the system and (2) inertial tracking data obtained using one or more inertial tracking components associated with the system;
obtain radio-based positioning data generated using one or more radio-based positioning components associated with the system;
limit a search space within a map of the mapped environment based on the radio-based positioning data; and
determine a pose of the system within the search space using at least a portion of the head tracking data as input.

* * * * *